(12) United States Patent
Brun

(10) Patent No.: US 11,300,148 B2
(45) Date of Patent: Apr. 12, 2022

(54) QUICK FASTENING AND/OR CONNECTION SYSTEM

(71) Applicant: Giancarlo Brun, Thiene (IT)

(72) Inventor: Giancarlo Brun, Thiene (IT)

(*) Notice: Subject to any disclaimer, the term of this patent is extended or adjusted under 35 U.S.C. 154(b) by 821 days.

(21) Appl. No.: 15/984,268

(22) Filed: May 18, 2018

(65) Prior Publication Data

US 2018/0266466 A1 Sep. 20, 2018

Related U.S. Application Data

(62) Division of application No. 14/386,779, filed as application No. PCT/IB2012/002011 on Oct. 10, 2012, now abandoned.

(30) Foreign Application Priority Data

Mar. 28, 2012 (IT) ................ VI2012A0071

(51) Int. Cl.
*F16B 21/07* (2006.01)
*F16B 21/20* (2006.01)
(Continued)

(52) U.S. Cl.
CPC .............. *F16B 21/07* (2013.01); *A47B 96/06* (2013.01); *E05B 1/0038* (2013.01); *E05B 17/2015* (2013.01); *E05B 47/0006* (2013.01); *E05B 65/46* (2013.01); *E05B 65/52* (2013.01); *E05C 1/08* (2013.01); *E05C 1/14* (2013.01); *E05C 19/007* (2013.01); *F16B 1/00* (2013.01); *F16B 21/16* (2013.01); *F16B 21/20* (2013.01);
(Continued)

(58) Field of Classification Search
CPC ........ E05C 19/007; F16B 21/165; F16B 2/16; F16B 21/07; F16B 21/16; F16B 21/20; E05B 17/2015; E05B 2063/0026; E05B 63/121; Y10T 403/592; Y10T 292/14
See application file for complete search history.

(56) References Cited

U.S. PATENT DOCUMENTS 1,487,987 A 3/1924 Taylor
1,593,227 A * 7/1926 Taylor .................. E05C 19/007
292/169.21
(Continued)

FOREIGN PATENT DOCUMENTS

CH 216890 A 9/1941
CH 600738 6/1978
(Continued)

*Primary Examiner* — Matthew R McMahon
(74) *Attorney, Agent, or Firm* — Lelkes IP; Robert Lelkes

(57) ABSTRACT

A quick connection and/or fastening system suited to mutually connect and disconnect a first and a second element is disclosed, the system including a first and a second component that are suited to be rigidly fixed to the first and second elements, respectively, the first component and the second component being also suited to be mutually connected and disconnected, the second component being suited to house an end portion of the first component in such a way as to allow its translation inside the second component, the second component comprising also counteracting elements suited to counteract the translation of the end portion of the first component towards the outside of the second component.

8 Claims, 22 Drawing Sheets

(51) Int. Cl.

| | |
|---|---|
| *A47B 96/06* | (2006.01) |
| *E05B 17/20* | (2006.01) |
| *E05B 65/46* | (2017.01) |
| *E05B 65/52* | (2006.01) |
| *E05C 1/08* | (2006.01) |
| *E05C 1/14* | (2006.01) |
| *E05C 19/00* | (2006.01) |
| *E05B 1/00* | (2006.01) |
| *E05B 47/00* | (2006.01) |
| *F16B 1/00* | (2006.01) |
| *F16B 21/16* | (2006.01) |
| *B60B 3/14* | (2006.01) |
| *E05D 5/04* | (2006.01) |
| *E05B 63/00* | (2006.01) |

(52) U.S. Cl.
CPC ......... *B60B 3/14* (2013.01); *E05B 2063/0026* (2013.01); *E05D 5/04* (2013.01); *F16B 1/0014* (2013.01); *F16B 21/165* (2013.01); *Y10T 403/602* (2015.01)

(56) References Cited

U.S. PATENT DOCUMENTS

| | | | |
|---|---|---|---|
| 1,721,102 A | | 7/1929 | Brandenburg |
| 1,733,108 A | * | 10/1929 | Bienaime ............ E05B 63/121 |
| | | | 292/252 |
| 2,277,172 A | * | 3/1942 | McKeon ................. F16B 2/16 |
| | | | 24/635 |
| 2,348,611 A | | 5/1944 | Stanley |
| 2,356,403 A | * | 8/1944 | Heidman ............ E05C 19/007 |
| | | | 292/252 |
| 2,593,662 A | | 4/1952 | Randel |
| 2,709,101 A | | 5/1955 | Randel |
| 2,864,635 A | * | 12/1958 | Lindner ............... E05C 19/007 |
| | | | 292/12 |
| 2,969,243 A | * | 1/1961 | Drazick ................ F16B 21/16 |
| | | | 279/76 |
| 3,377,115 A | * | 4/1968 | Hansen ................ A47B 88/906 |
| | | | 312/330.1 |
| 3,815,944 A | | 6/1974 | Noga |
| 3,896,698 A | | 7/1975 | Aylott |
| 3,964,125 A | * | 6/1976 | Tansley ..................... A62C 2/06 |
| | | | 16/48.5 |
| 4,057,274 A | | 11/1977 | Gompel |
| 4,318,563 A | | 3/1982 | Fowler |
| 4,468,843 A | * | 9/1984 | Duclos ............... A44B 11/2534 |
| | | | 24/635 |
| 4,956,899 A | | 9/1990 | Green |
| 5,222,776 A | | 6/1993 | Georgopoulos et al. |
| 5,352,003 A | | 10/1994 | Bystry |
| 6,014,796 A | * | 1/2000 | Harrison ............ A44B 11/2546 |
| | | | 24/633 |
| 6,065,897 A | | 5/2000 | Lutz, III |
| 6,431,616 B1 | * | 8/2002 | Julian ................. E05B 65/0014 |
| | | | 292/171 |
| 6,631,629 B1 | | 10/2003 | Fuss et al. |
| 7,509,713 B2 | | 3/2009 | Lewis |
| 10,180,150 B2 | * | 1/2019 | Barrellon .................. F16B 2/16 |
| 2003/0080079 A1 | | 5/2003 | Wu |

FOREIGN PATENT DOCUMENTS

| | | | | | |
|---|---|---|---|---|---|
| FR | 536447 A | * | 5/1922 | ........... | E05B 63/121 |
| GB | 191030274 A | * | 8/1911 | ................ | F16B 2/16 |
| GB | 1025811 A | | 4/1966 | | |
| GB | 2297793 A | | 8/1996 | | |
| JP | 1979047956 A | | 4/1979 | | |
| JP | 1980076205 A | | 6/1980 | | |
| JP | 1986017707 A | | 1/1986 | | |
| JP | 1986070211 A | | 4/1986 | | |
| JP | 2003228109 A | | 8/2003 | | |

* cited by examiner

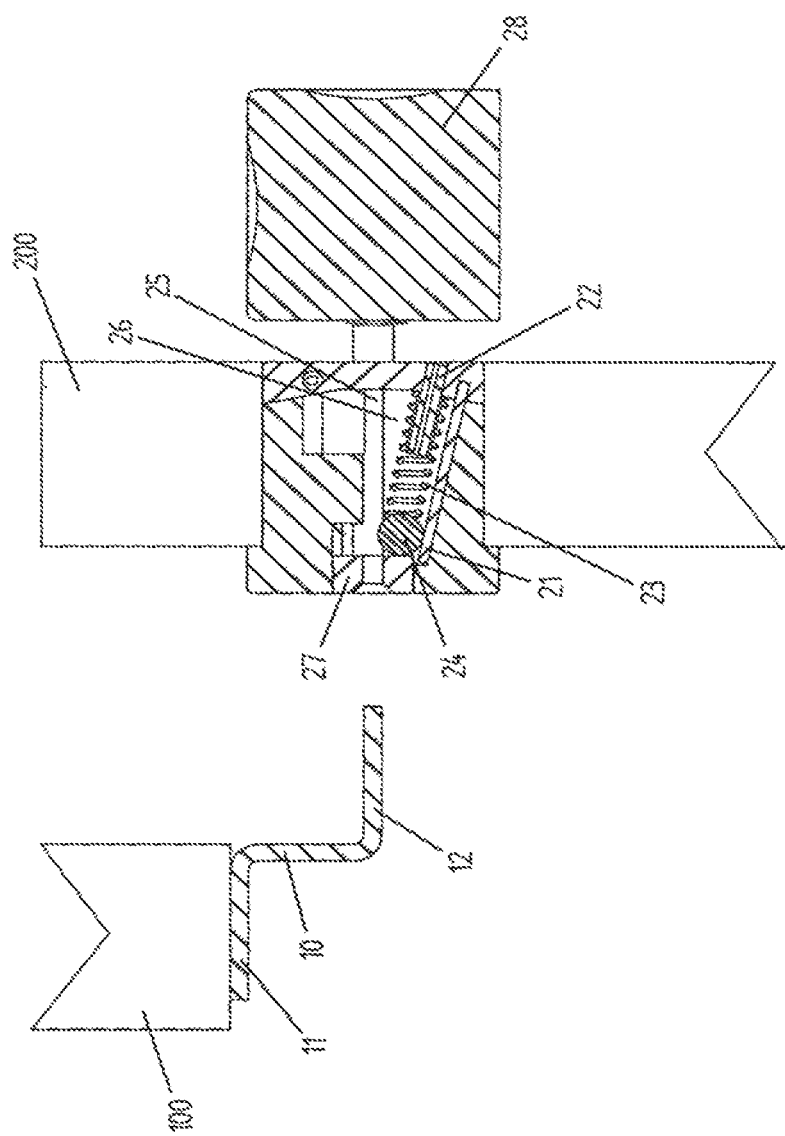

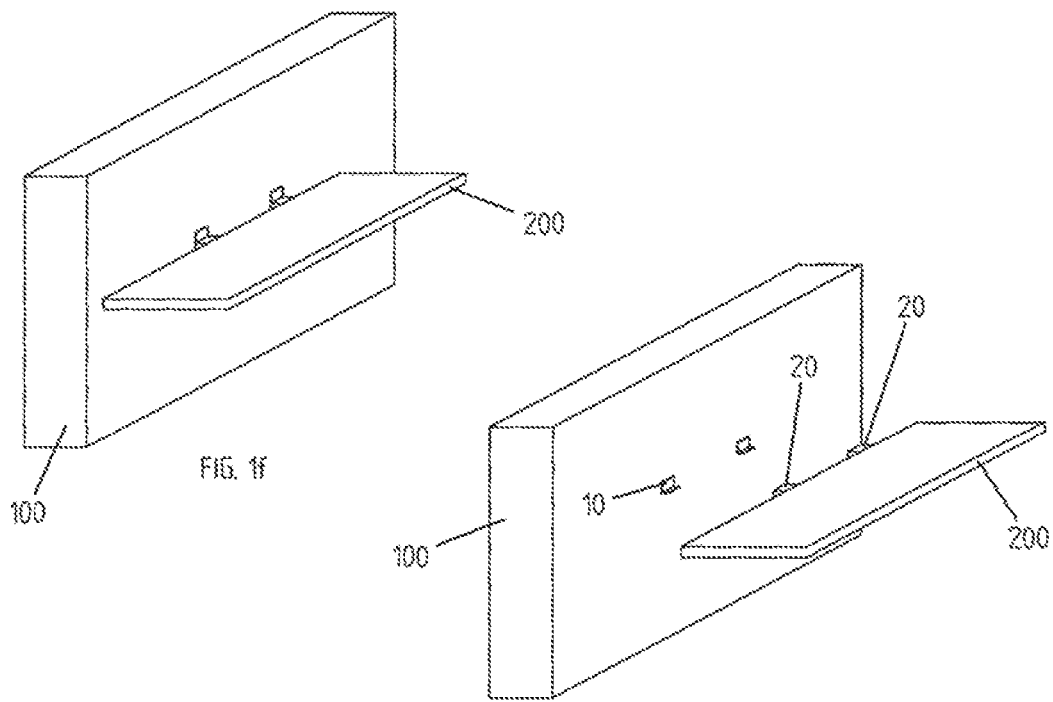
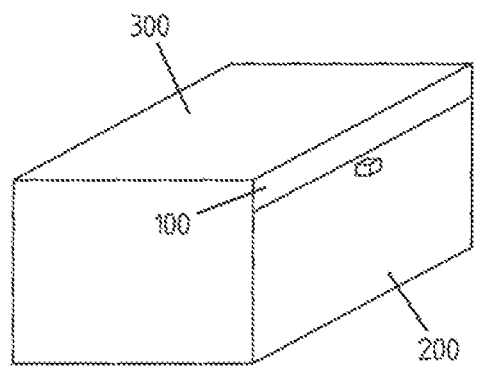
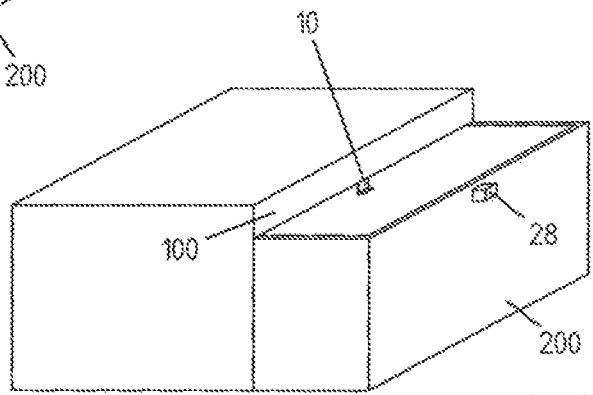

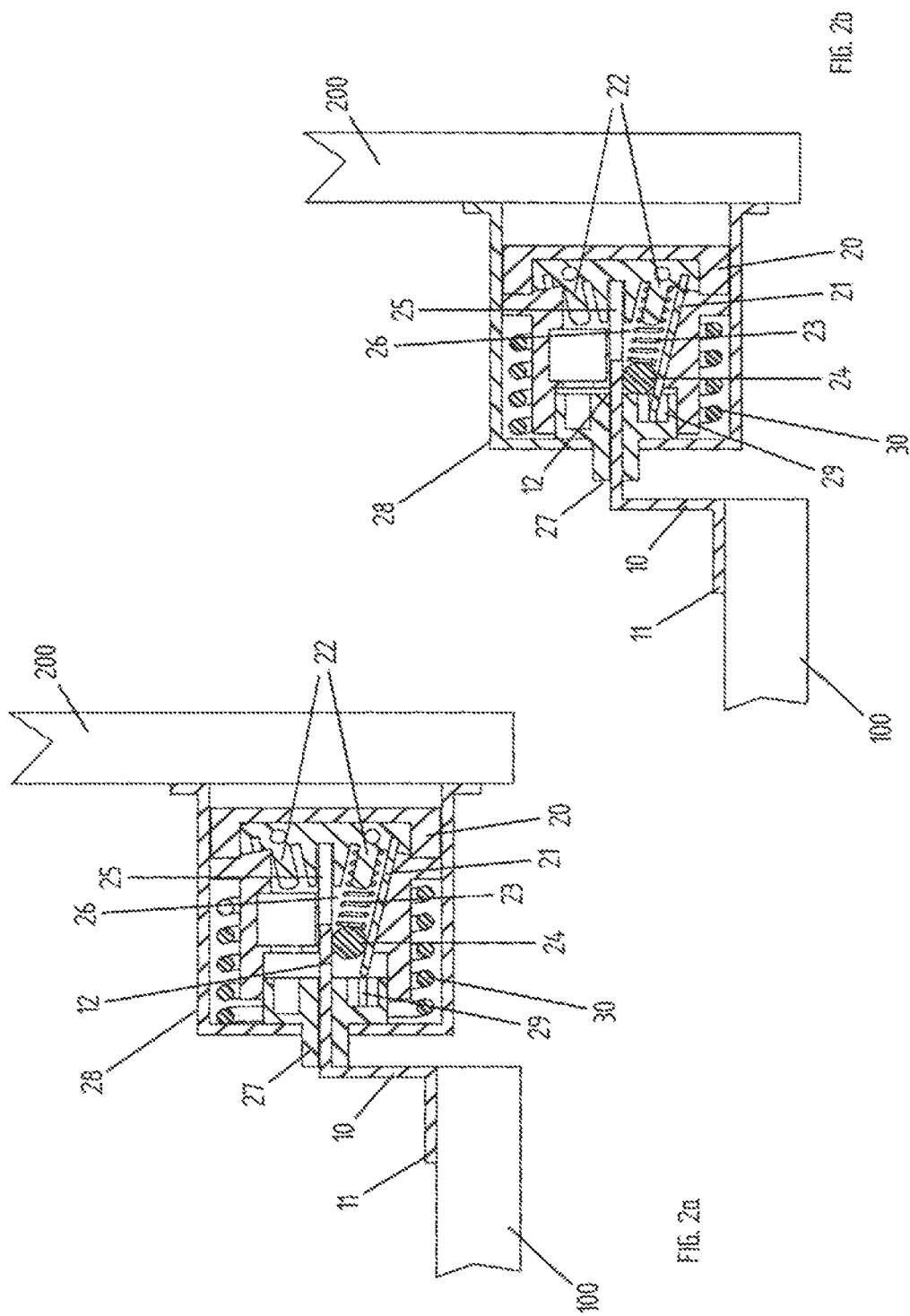

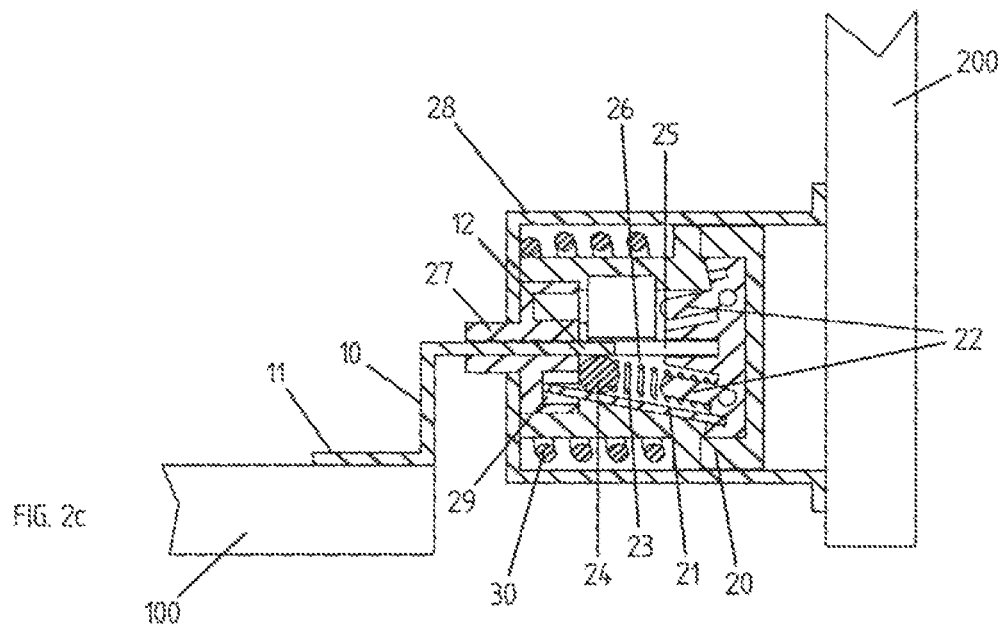
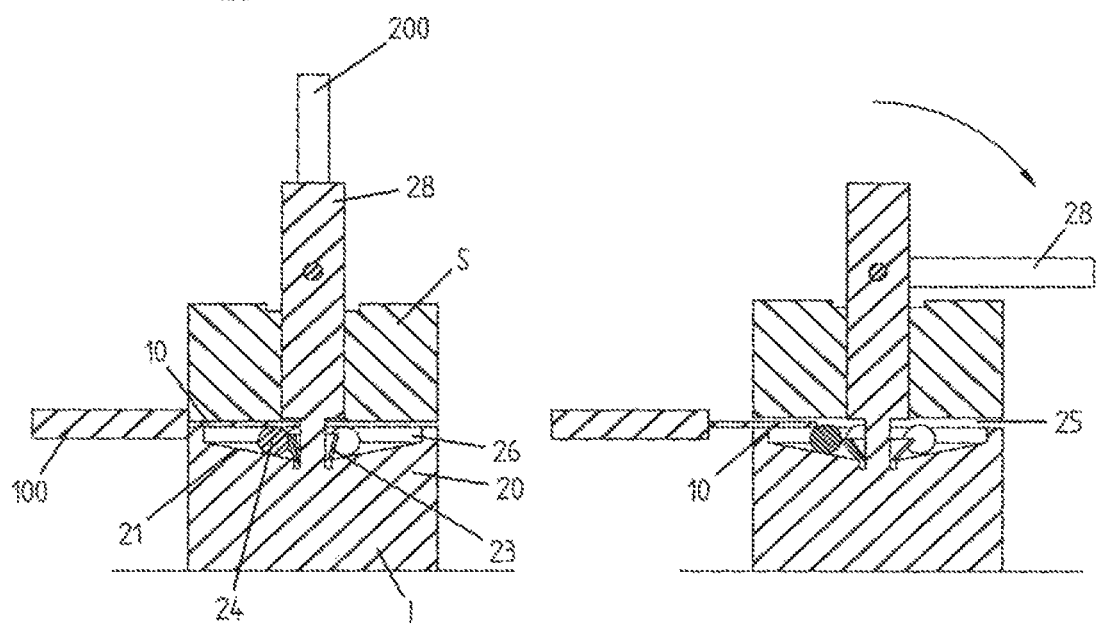

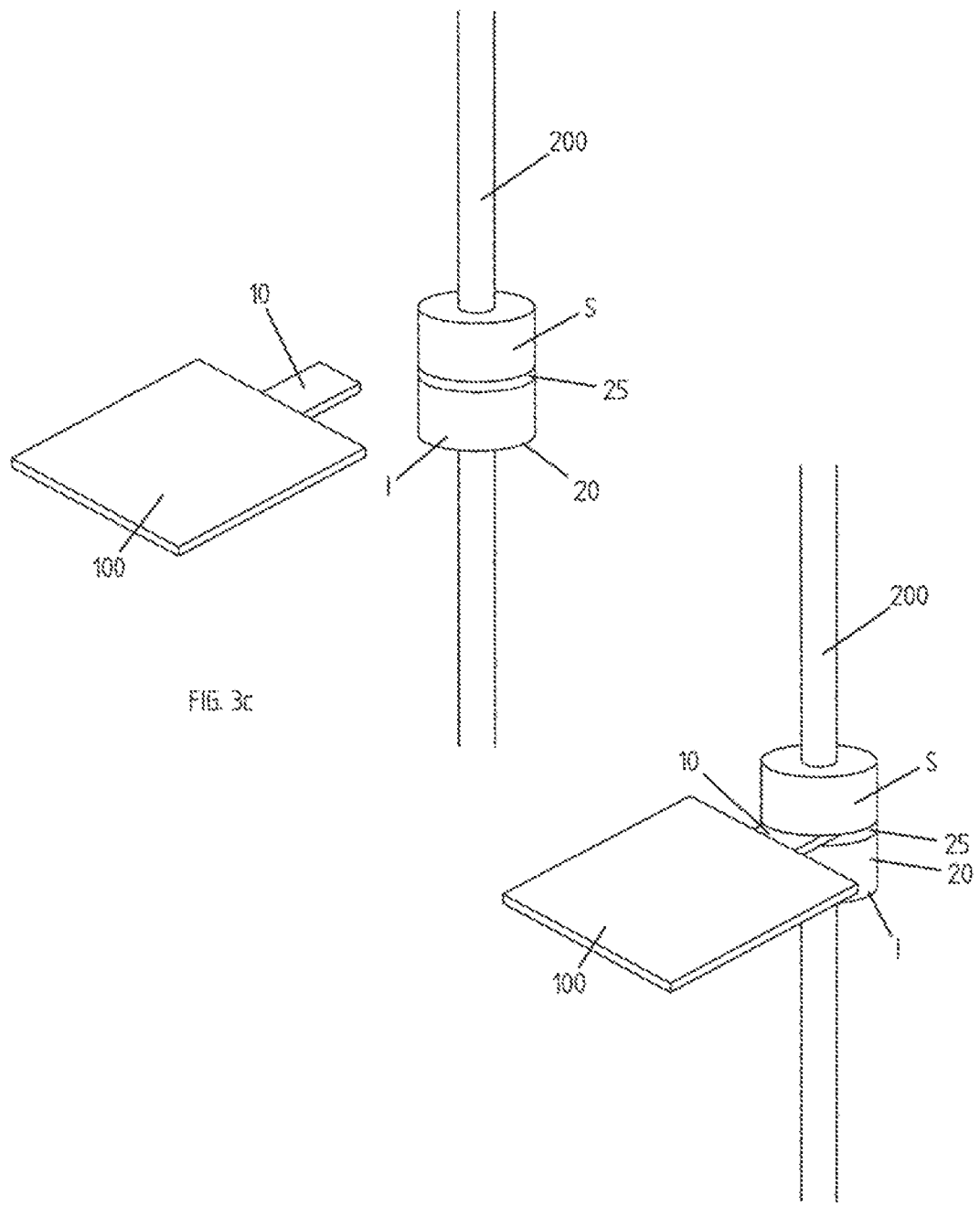

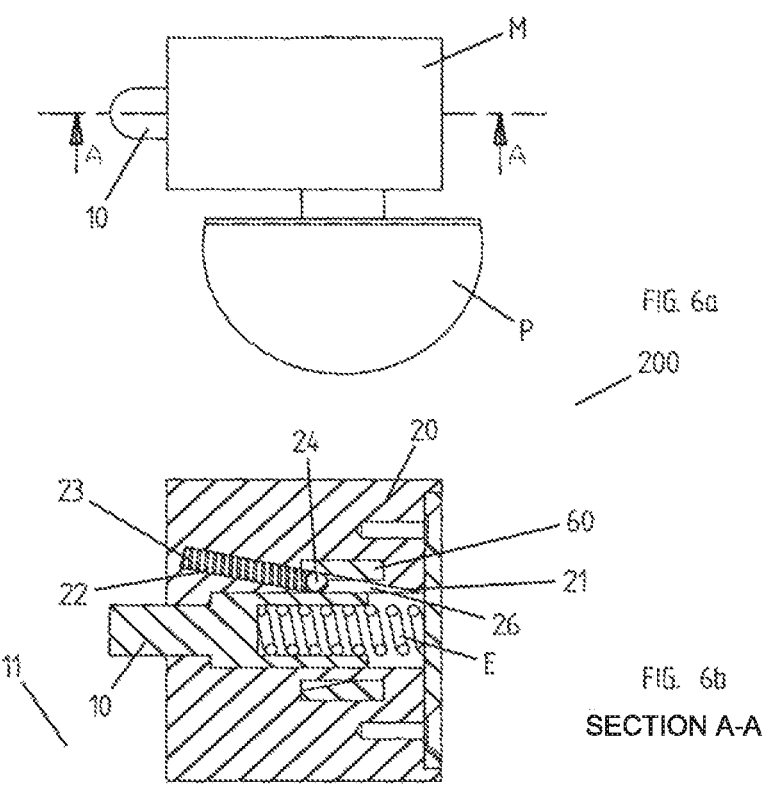
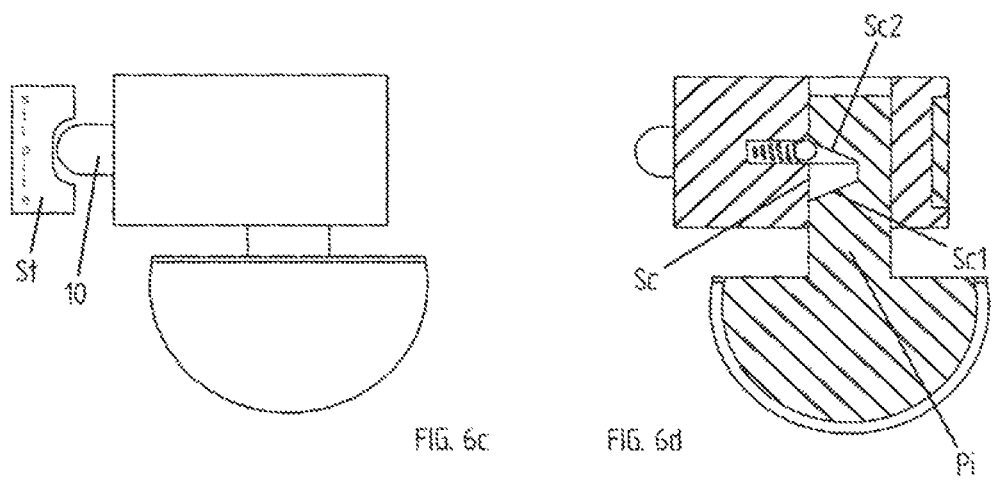

SECTION A-A

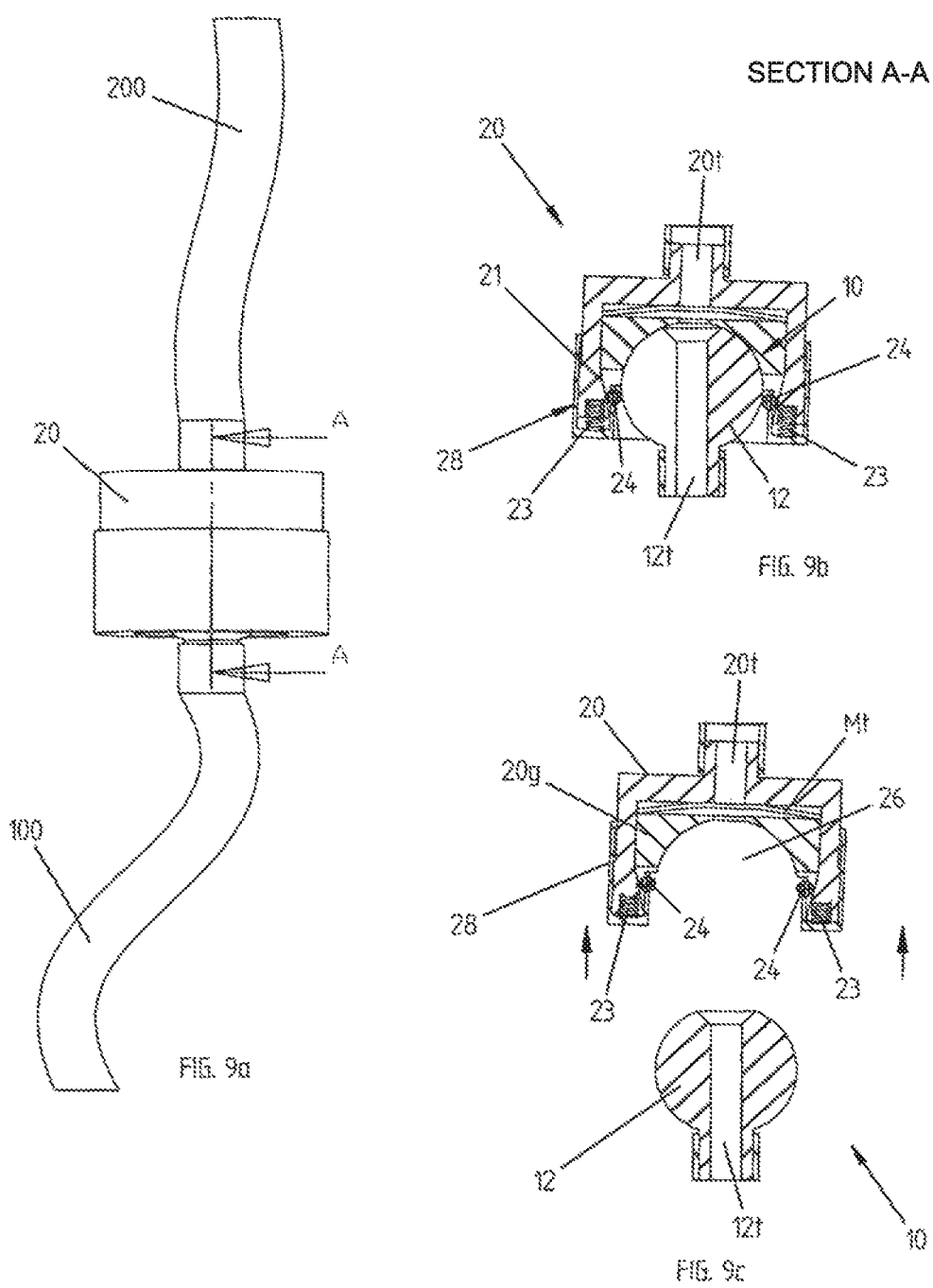

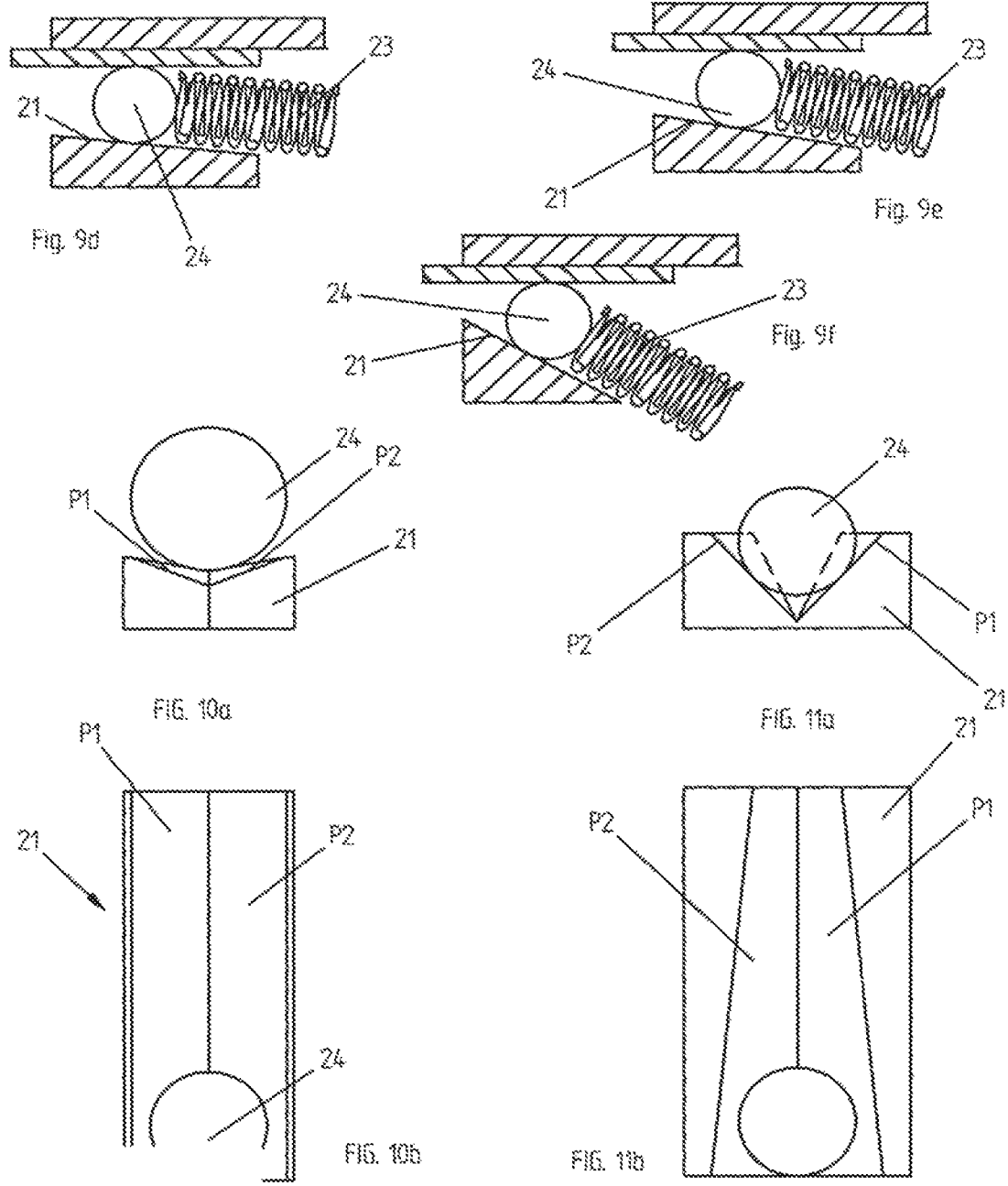

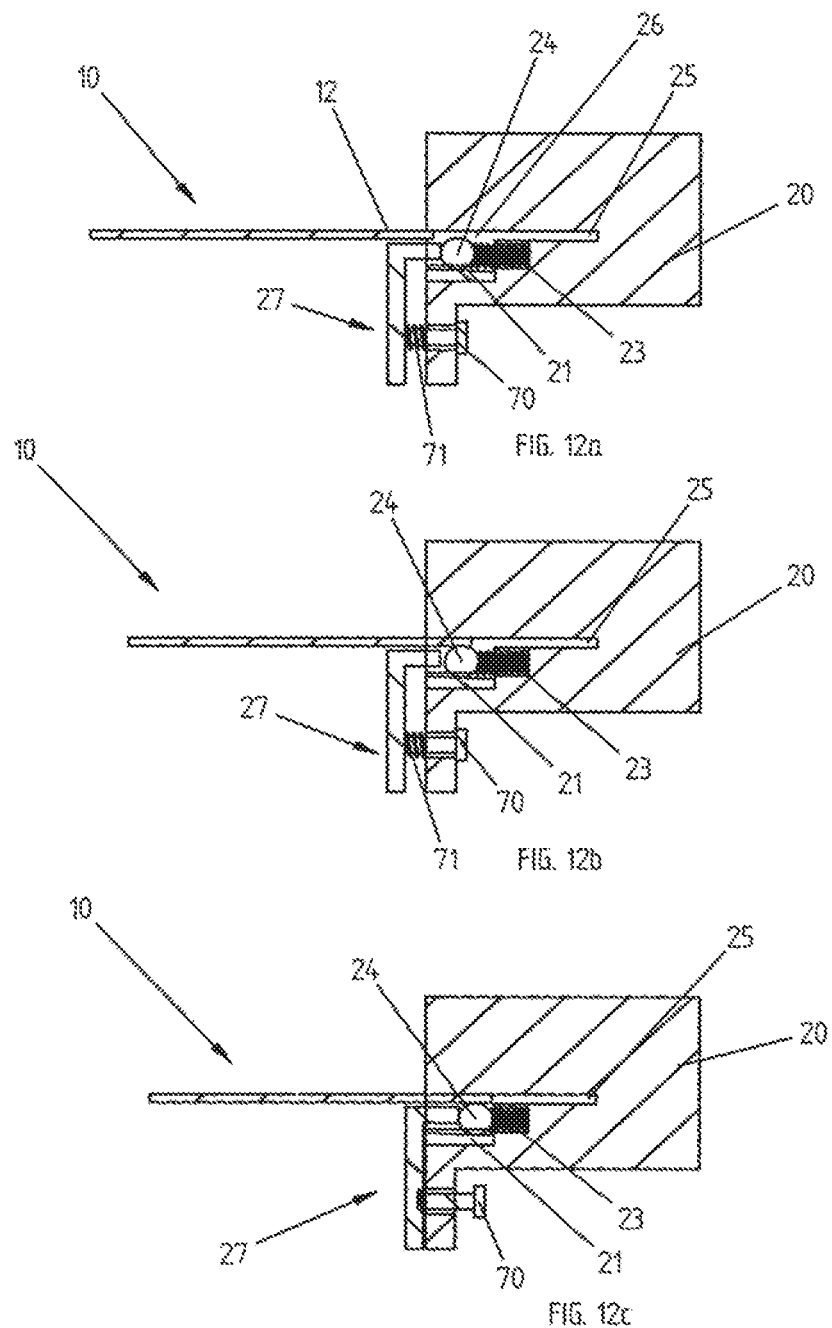

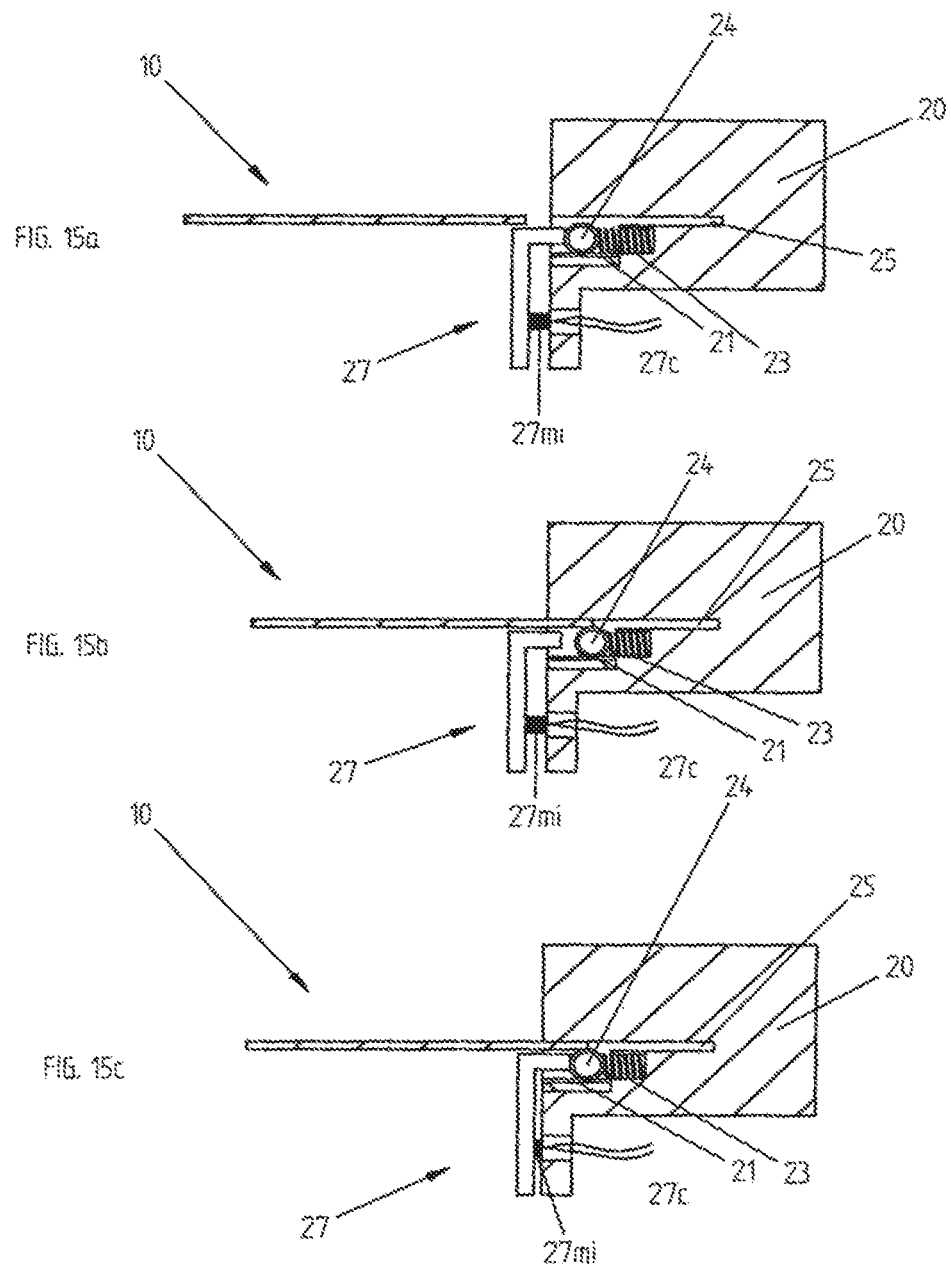

QUICK FASTENING AND/OR CONNECTION SYSTEM

CROSS-REFERENCE TO RELATED APPLICATIONS

This patent application is a divisional of U.S. patent application Ser. No. 14/386,779, which is the US national phase of PCT application no. PCT/IB2012/002011 filed on Oct. 10, 2012, which claims priority from Italian patent application no. VI2012A000071 filed on Mar. 28, 2012.

TECHNICAL FIELD OF APPLICATION OF THE INVENTION

The present invention concerns the field of quick connection and/or fastening systems suited to alternatively allow the mutual fastening and separation of two elements.

In particular, the present invention concerns the technical field of quick connection and/or fastening systems suited to alternatively allow the fastening and separation of two elements, like for example the upright or the bearing structure and a shelf of a shelving system, as well as a frame (for example, of a piece of furniture) and a door panel of the same piece of furniture.

The present invention, thus, concerns in particular a quick connection and/or fastening system suited to be used as a handle of doors and/or windows (for homes, cars, camper vans and vehicles in general), and/or even for doors of pieces of furniture for houses and not, like for example shelving systems, chests of drawers, wardrobes and/or even for replacing known fastening systems or means, like for example bolts and screws or nuts, for example for fixing the wheels of a vehicle.

DESCRIPTION OF THE STATE OF THE ART

In the state of the art connection and/or coupling systems are known, by means of which two components are mutually fixed to each other. Examples of connecting systems are known from U.S. Pat. No. 3,896,698 A e CH 600 738 A5. For example, in the case of construction of shelving systems and/or similar structures, systems are known, which allow the shelves to be fastened to the bearing structure of the shelving system as well as to be removed from the same. The most common systems comprise small metal parts, for example screws and anchors, as well as elements in pre-defined shapes and sizes suited to be fastened to the bearing structure and to the various shelves through said screws and/or said anchors. The assembly of a shelving system, for example, requires that the coupling or fastening elements that during the actual assembly will be coupled (engaged) with the coupling and/or fastening elements previously fixed to the shelves are arranged in advance on the shelving system.

If on the one hand the advantages offered by the most recent solutions can be recognized, it should however be noted that said solutions are not without drawbacks.

In particular, one of the typical drawbacks lies in that the actual anchorage elements must however be fixed in advance to the elements that must be mutually fastened to each other (for example, to the bearing structure and to the various shelves of a shelving system), using screws or similar means, and therefore in that it is not possible to reduce the overall assembly time by more than a certain amount of time.

Furthermore, in the case of modern shelving systems there is a tendency to avoid the use of screws or similar means due to their unpleasant appearance and due to the risk of damaging the component parts of a shelving system (for example, with scratches or similar types of damage).

Another examples of a connecting system is known from GB2297793 A. More particularly GB2297793 provides a device with a lever which is connected to a scoop to enable the scoop to be retracted against a spring and the ball is no connected with scoop. It has to be noted that in the mechanism of GB2297793 when the system is blocked, the ball is blocked between the ramp, the belt and the cover. So, when the lever connected to the scoop retracts the spring the scoop detaches from the ball, the ball remain blocked between the ramp and the belt. Furthermore in order to obtain the desired release action the system needs to act on the belt moving it down (FIG. 4).

Finally, the coupling systems of the known type, in particular the actual coupling means, do not offer the necessary guarantees and the necessary reliability against any accidental disengagement or uncoupling, so that there is the risk that during use of the completed structure (for example, while a book is being taken from a shelf) a shelf may be accidentally separated from the bearing structure, with serious risks for the user and consequent loss of stability of the same structure.

Regarding, furthermore, the quick connection and/or fastening systems suited to be used as a handle for door and/or window panels (for homes, cars, camper vans and vehicles in general), and/or for doors of pieces of furniture to be used in homes or even in other environments, like for example shelving systems, chests of drawers, wardrobes etc, also in this case it should be noted that many different solutions have been recently proposed. However, very often said solutions have been proposed to meet different needs, in such a way as to privilege, in some cases, the need for functionality and reliability, while in other cases the intention was to meet aesthetic or dimensional needs and in other cases the focus was on ease of assembly and installation.

Thus, none of the known solutions actually meets all the needs mentioned above.

For example, the handles of the classical type (rotating handles, handles with rack mechanism or the like) usually offer suitable guarantees regarding their functionality (which makes them the most appreciated and the preferred solution for use on doors, windows or door/window frames for homes in general) but are often characterized by considerable dimensions, which make them unsuitable for specific applications, for example on pieces of furniture or cabinets intended to be used especially in camper vans or in any case in reduced spaces. In the same way, the solutions known and more suited to be used for different purposes, like for example in the case of cabinets, are often characterized by a simple construction that reduces their size and makes them easy to assemble and to use but that often is to the detriment of reliability and functionality.

It is thus one of the objects of the present invention to overcome the drawbacks mentioned above and present in the solutions known in the state of the art.

In particular, the objects and aims of the present invention can be summed up as follows.

It is a first object of the invention to provide a solution that can be used as an alternative to the handles of door leaves, doors, windows and door/window frames of the known type in general, as an alternative to the connection and/or fastening systems used and known in the art for the quick assembly of structures like for example shelving systems and/or similar structures, and finally also as an alternative to fixing means like bolts, nuts etc.

It is thus, in particular, a further object of the present invention to provide a quick connection and/or fastening system that, if used as a handle, offers suitable guarantees in terms of reliability (eliminating or drastically reducing the risk of accidental opening of the door or window), in terms of functionality (allowing the door or window to be opened by means of simple and immediate operations), in terms of construction simplicity (including a limited number of component parts that are simple and easy to manufacture), as well as in terms of ease of assembly and/or application to the corresponding panel or door, and that has reduced overall dimensions.

In greater detail, it is a further object of the present invention to provide a quick connection and/or fastening system that, if used for the mutual fastening of two rigid elements (for example, for assembling shelving systems and/or similar structures), offers suitable guarantees against the risk of accidental uncoupling of the parts mutually fixed to each other by means of said system, said system being furthermore easy to assemble, suited to be constructed with simple operations as quickly as possible, as well as suited to be applied in a simple and immediate way and in a short time to the parts to be mutually fastened and/or connected, and having an appearance that is not antiaesthetic and a reduced size.

DESCRIPTION OF THE PRESENT INVENTION

The present invention can be specifically and conveniently applied in the field of construction of handles, for example for doors, windows and door/window frames in general, as well as for pieces of furniture, shelving systems, chests of drawers etc. Thus, this is the reason why most of the examples of application of the device according to the present invention that are described below refer to the specific case of the handles normally used, in fact, on the doors of pieces of furniture, on chests of drawers etc, as well as on common doors and/or windows.

It should however be noted that the possible applications of the device according to the present invention are not limited to the specific case of handles. On the contrary, the present invention can be advantageously applied in all the cases where it is necessary to mutually fix two components in a quick and reliable manner (avoiding any accidental uncoupling), for example two components of a structure that may even be more complex, in particular a wheel (for example of a motor vehicle) to the corresponding hub or axle shaft.

The present invention is based on the general consideration that the disadvantages or drawbacks that are typical of the solutions known in the art (in particular of the systems usable as handles) can be overcome or at least reduced to a minimum by providing a quick connection and/or fastening system comprising a first and a second component that are suited to be alternatively connected to and disconnected from each other, as well as to be respectively fixed to a first and a second element (for example, the frame of a door and the swinging panel of said door, or the structure of a wardrobe or cabinet and a swinging door panel or even the front panel of a drawer), in which the mutual connection of said two components takes place through the translation of a portion of said first component inside said second component, while disconnection takes place through the translation of said portion of said first component in a direction substantially opposite the coupling direction. In this way, the functionality of the device (the handle) is considerably simplified as, for example in the case of a drawer, the user does not have to carry out special operations but in order to close the drawer and thus connect the two components of the handle he/she just needs to push the drawer in the closing direction, while to disconnect the two components of the handle (to open the drawer) he/she simply needs to pull the handle in the opening direction, substantially opposite the closing direction. Furthermore, in this way it is possible to obtain a handle characterized by a reduced number of components, each one of which is simple to construct and thus easy to assemble, in a limited time and at reduced costs. The overall dimensions of the handle, furthermore, are reduced, with evident advantages also from an aesthetic point of view.

A further consideration on which the present invention is based concerns the fact that additional advantages can be obtained by providing the second component of the handle with means suited to counteract the translation of the portion of the first component in the uncoupling direction, said counteracting means being activated by the same translation of said portion of said first component. In this way, in fact, the handle is automatically activated against the accidental uncoupling of the two components.

Additional advantages are obtained by providing counteracting means that are such that the force exerted by them against the translation of the end portion of the first component in the uncoupling direction increases along the translation direction of said end portion, until causing said end portion to become locked inside said second component.

Moreover, further advantages will be obtained by providing the second component with means suited to deactivate said counteracting means, in such a way as to be able to obtain the mutual disconnection of said first and second component every time and only when this is necessary.

Considerable advantages can be finally obtained when said deactivation means are constructed in such a way as to deactivate the counteracting means through the translation of said deactivation means in the same opening direction of the element to which the second component of the handle is applied, for example in the opening direction of a drawer. In this way, in fact, the intervention of the user to deactivate the counteracting means will allow the practically simultaneous opening of the drawer.

A first embodiment of the present invention is a quick connection and/or fastening system suited to mutually connect and disconnect a first and a second element, said system comprising a first and a second component suited to be respectively fixed to said first and second component, as well as suited to be mutually connected and disconnected in such a way as to alternatively allow the mutual connection and disconnection of said first and second element, said second component being suited to house an end portion of said first component in such a way as to allow it to translate inside it, said second component comprising also counteracting means that are suited to counteract the translation of said end portion of said first component towards the outside of said second component.

According a further embodiment of the invention, the subject of the present invention is a connection and/or fastening system in which said second component comprises a rotatable element that is set rotating in a first rotation direction by the translation of the end portion of the first component towards the inside of the second component and that is set rotating in a second rotation direction contrary to the first rotation direction by the translation of the end portion of the first component towards the outside of the second component. Furthermore, said counteracting means are suited to counteract the rotation of said rotatable element in said second rotation direction.

According to a further embodiment of the invention, said second component comprises a rigid portion that together with said end portion of said first component defines an inner space in which said rotatable element is housed and in which said rigid portion, said end portion and said rotatable element are shaped and mutually positioned so that said counteracting force is generated owing to the mutual action of said rigid portion and said end portion on said rotatable element.

Further advantages are guaranteed by the additional embodiments of the system according to the present invention that are defined in the further dependent claims.

BRIEF DESCRIPTION OF THE DRAWINGS

The present invention is illustrated here below through the description of some embodiments of the same illustrated in the attached drawings. It should however be noted that the present invention is not limited to the embodiments illustrated in the drawings; on the contrary, the field of application and the scope of the present invention include all those variants and changes to the embodiments shown and described herein that appear to be clear, obvious and immediately understandable to any person skilled in the art. In particular, in the attached drawings:

FIGS. 1a, 1b and 1c show each a sectional view of a first embodiment of the system according to the present invention with the first and the second component of said system respectively in the coupling position, in a position where they are going to be released from each other and in the released position;

FIGS. 1d and 1e show a first example of use of the system according to the embodiment of the present invention illustrated in FIGS. from 1a to 1c;

FIGS. 1f and 1h show a second example of use of the system according to the embodiment of the present invention illustrated in FIGS. from 1a to 1c;

FIGS. 2a, 2b and 2c show each a sectional view of a second embodiment of the system according to the present invention with the first and the second component of said system respectively in the coupling position, in a position where they are going to be released from each other and in the released position;

FIGS. 3a and 3b show each a sectional view of an illustrative example of the system according to the present invention with the first and the second component of said system respectively in the coupling position and in a position where they are going to be released from each other;

FIGS. 3c and 3d show an example of use of the system according to the illustrative example of the present invention illustrated in FIGS. 3a and 3b;

FIGS. 6a, 6b, 6c and 6d concern a further embodiment of the system according to the present invention;

Figure 7A:
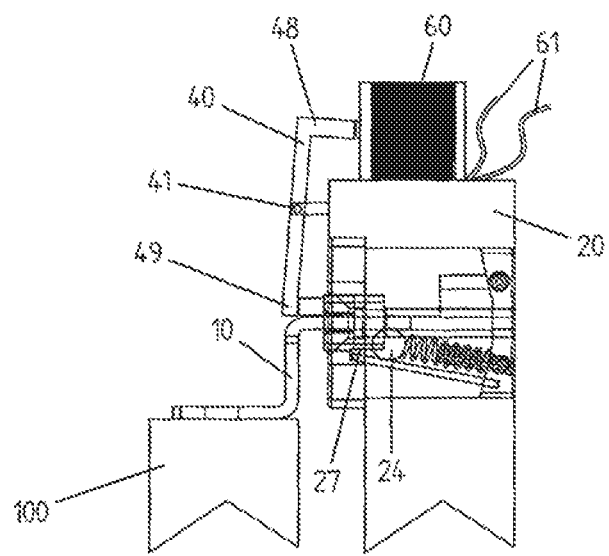
FIGS. 7a and 7b show each a sectional view of a further embodiment of the system according to the present invention with the first and the second component of said system respectively in the coupling position and in a position where they are going to be released from each other.
Figure 7B:
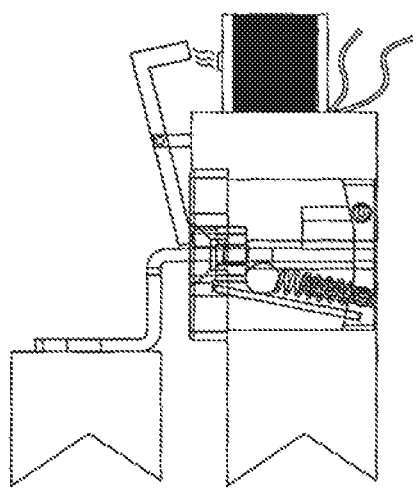
Figure 16:
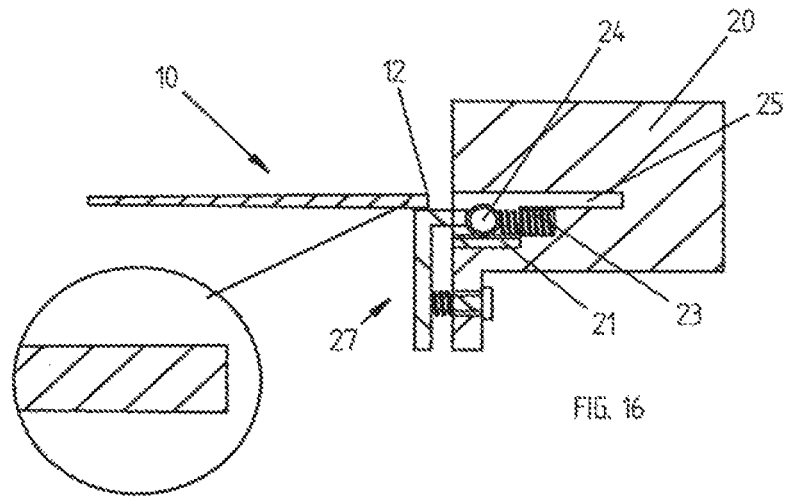
Figure 17A:
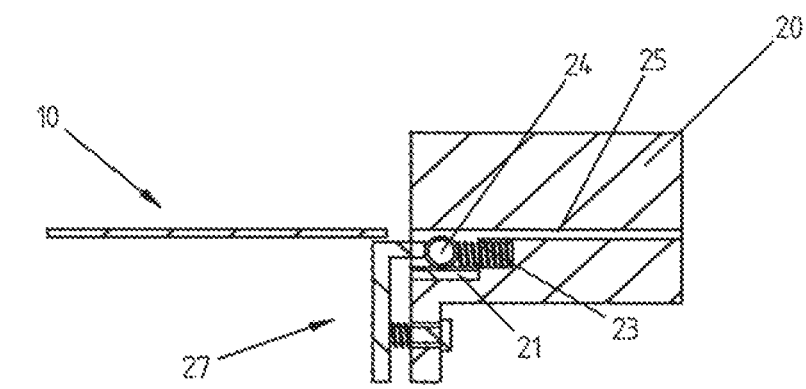
Figure 17B:
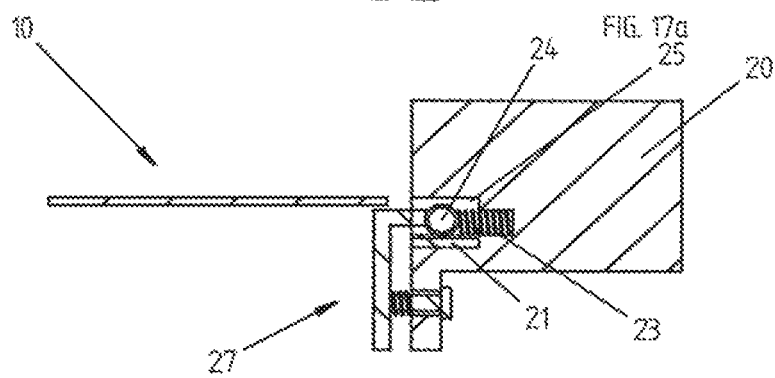
Figure 17C:
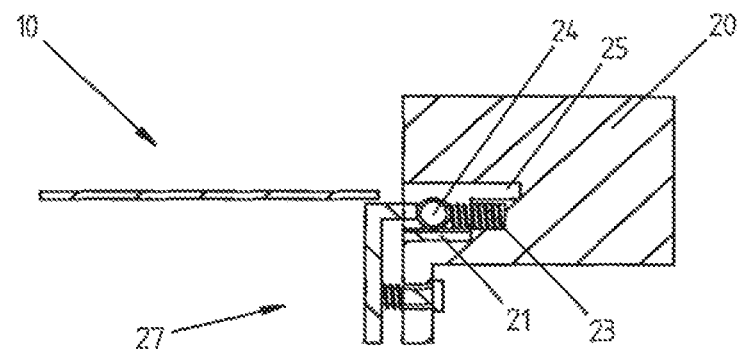
Figure 17D:
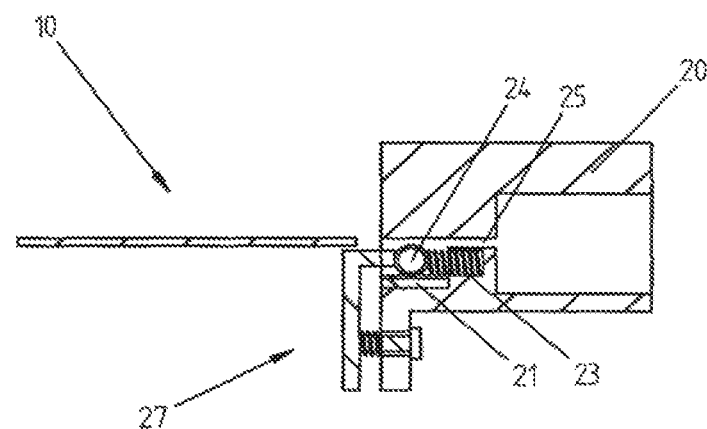
Figure 18:
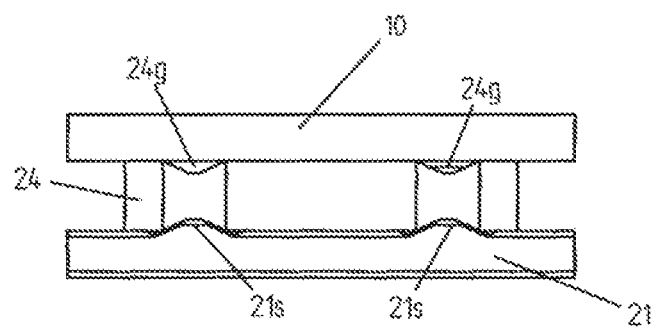

FIGS. from 8a to 8c respectively show a front view and two sectional views of a further embodiment of the system according to the present invention;

FIGS. from 9a to 9c respectively show a side view and two sectional views of a further embodiment of the system according to the present invention;

FIGS. 9d, 9e and 9f show details of three variants of the embodiment shown in FIGS. 7a and 7b;

FIGS. 10a and 10b respectively show a front view and a plan view of some component parts of a further embodiment of the present invention;

FIGS. 11a and 11b respectively show a front view and a plan view of some component parts of a further embodiment of the present invention;

FIGS. from 12a to 12c show a corresponding number of sectional views of a further embodiment of the system according to the present invention;

FIGS. from 13a to 13c show a corresponding number of sectional views of a further embodiment of the system according to the present invention;

FIGS. from 14a to 14c show a corresponding number of sectional views of a further embodiment of the system according to the present invention;

FIGS. from 15a to 15c show a corresponding number of sectional views of a further embodiment of the system according to the present invention;

FIG. 16 shows a sectional view of a further embodiment of the system according to the present invention;

FIGS. 17a and from 17b to 17d show a corresponding number of sectional views of a further embodiment of the system according to the present invention;

FIG. 18 shows a front view of component parts of a further embodiment of the system according to the present invention.

DETAILED DESCRIPTION OF SOME EMBODIMENTS OF THE PRESENT INVENTION

The first embodiment of the present invention shown in FIGS. from 1a to 1c comprises a first component 10 and a second component 20 that are suited to interact with each other as will be explained in greater detail below. The first component 10 is shaped as a small bar (for example in metal, plastic or another similar rigid material) and is suited to be rigidly fixed to a first element 100, for example the bearing structure of a shelving system or a chest of drawers, or even a doorpost or a door/window frame in general. The second component 20 is made in the shape of a handle and therefore is suited to be rigidly fixed to a second element 200, for example a revolving door or window, or even the front panel of a drawer. For this purpose, the second component 20 comprises a first portion suited to be housed in a proper seat in the element 200 and a second, so-called external portion 28 that serves as handle knob. The first component 10 then comprises an end portion 11 through which the first component is fixed to the element 100, as well as a second end portion 12, opposite the first end portion 11 and suited to be received and housed in a hollow seat 25 that has a complementary matching shape and is obtained completely in the second component 20. Inside the second component 20 there is also a space 26 delimited on one side by a rigid portion 21 (for example, a metal strap) inclined with respect to the end portion 12 of the first component 10. In particular, the end portion 12 is suited to translate inside the seat 25 so as to graze the space 26 on the opposite side with respect to the inclined portion 21. For the sake of clarity, the translation direction of the end portion 12—from left to right in FIG. 1a—here below will be defined also as the translation direction towards the inside of the second component 20, while the translation direction of the end 12—from right to left in FIGS. 1a and 1b—will be defined also as the translation direction towards the outside of the second component 20. The inclination of the portion 21 is such that the distance between it and the end portion 12 decreases when proceeding along the translation direction of the same end 12 towards the outside of the second component 20, while it increases in the opposite direction, meaning the translation direction towards the inside of the component 20. Inside the space 26 there is also a helical spring 23 fixed to or fitted on a rigid element 22 (for example, a small cylindrical bar) whose outer diameter will substantially coincide with the inner diameter of the helical spring 23. Always inside the space 26 there is a rotatable and translatable element 24, for example a small cylinder, a rod iron piece or even a ball, positioned at the level of the free end of the helical spring 23 so that the helical spring 23 exerts a thrusting action on said rotatable element 24 towards the end of the space 26 in which the distance between the rigid portion 21 and the end portion 12 decreases. Inside the second component 20 there is also (in a proper seat with a matching shape) a release element 27 suited to be translated inside the second component 20 in a direction substantially parallel to the translation direction of the end portion 12 and thus from left to right in FIG. 1a (towards the inside of component 20) and from right to left in FIG. 1a (towards the outside of component 20). The release element 27 is particularly suited to be translated towards the inside of the component 20 through the action exerted by a user on the knob 28 (the release element 27 and the knob 28 thus being mutually connected through connection means not illustrated in the figures and, for example, also housed inside the component 20), and thus through the traction exerted by a user on the knob 28 from left to right in FIG. 1a, the same release element 27 being also suited to be translated towards the outside of the component 20 through a thrusting action exerted by a user on the knob 28 in the direction opposite the traction direction, and thus from right to left in FIG. 1a. During its translation towards the inside of the second component 20, the release element 27 will come to rest against the rotatable element 24 thus pushing it towards the inside of the component 20 against the action of the spring 23, and thus pushing it towards that portion of the inner space 26 in which the distance between the rigid portion 21 and the end portion 12 of the first component 10 increases.

The operation of the connection system (the handle) according to the embodiment of the present invention illustrated in FIGS. from 1a to 1c can be summed up as follows. The mutual connection of the first component 10 and the second component 20 is obtained by translating or sliding the end portion 12 of the first component 10 towards the inside of the second component 20. During the translation movement of the end portion 12 towards the inside of the component 20, the surface of the end 12 facing towards the portion 21 comes into contact with the external surface of the rotatable element 24 that thus is first set rotating clockwise and successively set translating thanks to the friction generated between the end portion 12 and the rotatable element 24, said rotatable element 24 being in contact also with the surface of the portion 21 facing towards the end portion 12 of the first component 10. During its clockwise rotation and its successive translation, the rotatable element 24 thus moves against the action of the spring (from left to right in FIG. 1a) and thus towards that part or portion of the space 26 in which the distance between the rigid portion 21 and the end portion 12 of the first component 10 increases. The rotatable and translatable element 24, therefore, does not hinder the translation of the end portion 12 towards the inside of the component 20, so that the end portion 12 is able to reach its final position inside the component 20 as shown in FIG. 1a, final position that is thus defined as a mutual locking position between the first component 10 and the second component 20, in such a way as to mutually lock the two elements 100 and 200 in a predefined position.

Figure 1A:
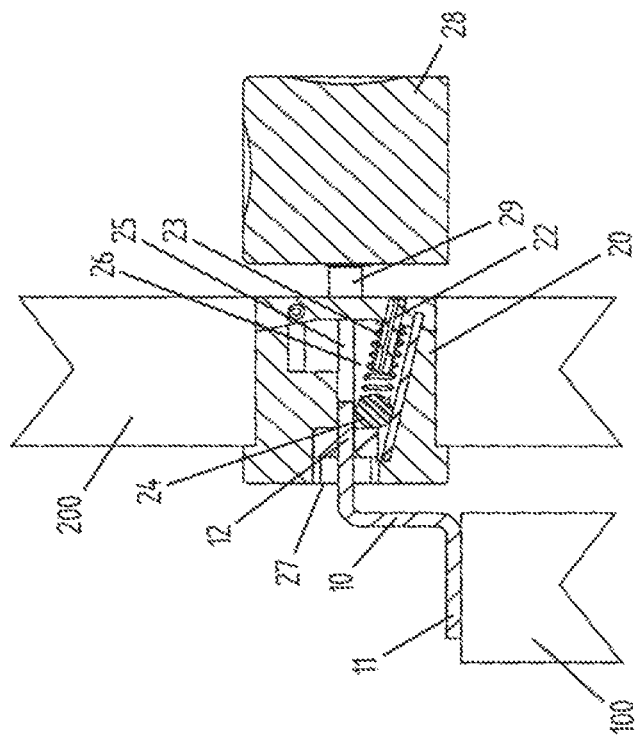
Figure 1B:
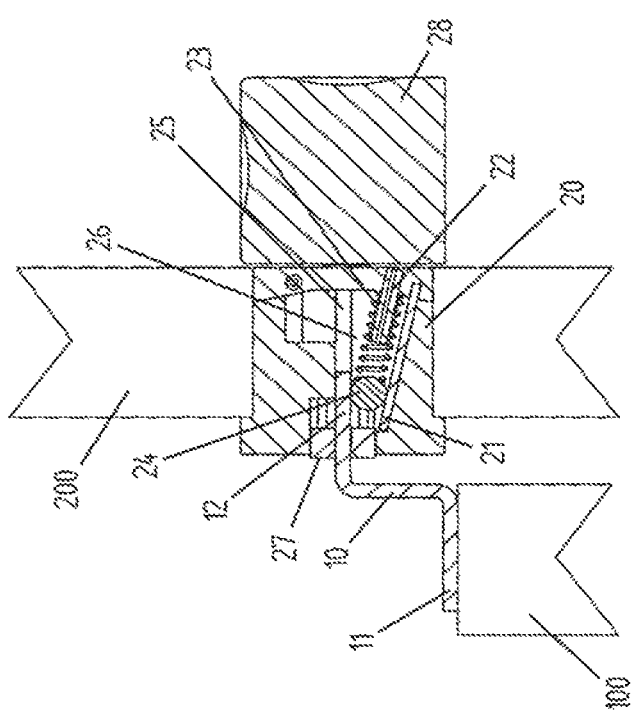

The accidental release of the first component 10 and of the second component 20 (and thus, for example, the accidental opening of a drawer or of a door or window) is therefore impossible, since in the locking condition illustrated in FIG. 1a any accidental translation of the end portion 12 towards the outside of the component 20 is impossible. In fact, during the translation of the end portion 12 towards the outside of the component 20, the rotatable element 24 is set rotating anticlockwise, and if necessary is even set translating (thanks to the friction between the end portion 12 and the rotatable element 24 itself) and thus moved towards that portion of the space 26 in which the distance between the rigid portion 21 and the end portion 12 decreases. The movement of the rotatable element 24 towards said portion of the space 26 (and thus substantially towards the outside of the component 20) leads the rotatable element 24 to become engaged between the end portion 12 and the portion 21, so that at a certain point neither a further anticlockwise rotation of the element 21 nor a further translation of the end portion 12 towards the outside of the component 20 will be possible. In other words, at a certain point during its anticlockwise rotation, and thus at a certain point during the translation of the end portion 12 towards the outside, the rotatable element 24 will become engaged between the end portion 12 and the rigid portion 21 so as to lock even the end portion 12. Therefore, a user who wants to open, for example, a door or a drawer (the element 200) by acting directly on said door or drawer so as to exclude the component 20 (without exerting any action on the knob 28) will not be able to obtain the mutual release of the component 20 and the component 10, and thus will not be able to open said door or drawer. The mutual release of the two components 10 and 20 (and thus the opening of the door or drawer) will on the other hand be possible by pulling the knob 28 from left to right as shown in FIG. 1b, and thus in such a way as to translate the release element 27 towards the inside of the component 20. In fact, during its translation towards the inside of the component 20, the release element 27, as already explained above, pushes the rotatable and translatable element 24 towards the inside of the component 20 and thus towards the portion of the space 26 in which the distance between the portion 21 and the end 12 increases. In this way, therefore, the opposing action (friction) between the external surface of the rotatable and translatable element 24 and the surface of the end portion 12 facing towards the rigid portion 21 decreases (even to the extent of being completely eliminated in the position in which the rotatable and translatable element 24 is not in contact with the end portion 12 any longer). Therefore, in these conditions, a translation of the end portion 12 towards the outside of the component 20 leads neither to an anticlockwise rotation of the rotatable element 24 nor to its movement or shift towards the outside (towards that portion of the space 26 in which the distance between the end 12 and the portion 21 decreases), so that the end 12 is free to translate until moving completely out of the component 20, as shown in FIG. 1c. It can thus be understood from the above that, for example in the case of a drawer 200 withdrawable from a chest of drawers from left to right as shown in FIG. 1a, a user will be able to open said drawer 200 by simply pulling the knob 28 in the same opening direction of the drawer, so that a single traction operation exerted on the knob 28 will first allow the mutual release of the two components 20 and 10 of the system and also the opening of the drawer itself. On the contrary, any attempt to open the drawer 200 without exerting any action on the knob 28 will lead to the mutual locking of the two components 20 and 10 of the system.

FIGS. 1d and 1e schematically show a first example of use or application of the system according to the embodiment of the present invention previously described. In this case, in fact, the first component 10 is rigidly fixed to the bearing structure 100 of a chest of drawers or cabinet 300, while the second component 20 is applied to the front panel of a drawer 200 so that the knob 28 of the system projects from the front panel 200 towards the outside of the cabinet 300. The opening and closing of the drawer will thus be achieved by proceeding as previously described, through a pulling or pushing action exerted on the knob 28.

A second example of application or use of the embodiment of the system according to the present invention as previously described is shown in FIGS. 1f and 1h. In this case, the element 100 is constituted by a vertical wall while the element 200 is constituted by a shelf. Two components 10 are rigidly fixed to the vertical wall 100 and two components 20 are fixed to the shelf 200, on the edge of the same that is intended to be facing towards the vertical wall 100. The assembly of the shelving system shown in FIGS. 1f and 1h will thus be obtained by previously fixing the components 10 to the vertical wall 100 and the components 20 to the shelf 200 in corresponding positions. Finally, pushing the shelf 200 towards the vertical wall 100 leads to the mutual locking of the components 10 and 20 and thus to the fastening of the shelf 200 to the vertical wall 100. To remove the shelf it will thus be necessary to act only on the components 10 and/or 20 as described above and then to move the shelf 200 away from the vertical wall 100.

A further embodiment of the system according to the present invention is described here below with reference to FIGS. from 2a to 2c; in the FIGS. from 2a to 2c those component parts or characteristics of the system according to the present invention already described above are identified by the same reference numbers.

The embodiment shown in FIGS. from 2a to 2c comprises many of the component parts that are present in the embodiment described above with reference to FIGS. from 1a to 1c. In fact, in FIG. 2a it is possible to observe a first component 10 with a first end 11 through which said first component 10 is fixed to a first element 100, and a second end 12 housed in a seat 25 obtained inside the second component 20 so that it can slide and be translated inside said second component 20. A space 26 is obtained also in this case inside the component 20 so that said inner space 26 is in contact with the seat 25 where the end 12 is housed and slides. Also in this case the inner space 26 is defined by a rigid portion 21 that is inclined with respect to the sliding direction of the end 12 so that the distance between the portion 21 and the end portion 12 decreases towards the outside of the component 20. A supporting element 22 extends inside said space 26 and is provided with a helical spring 23 engaged therein, which pushes towards the outside of the component 20 (and thus towards that portion of the space 26 in which the distance between the portion 21 and the end portion 12 is shorter) a rotatable and translatable element 24 (for example a small cylinder, a pawl or even a ball) that is housed inside the space 26, too. The main difference between this embodiment and the embodiment previously described lies in that, in this case, the hand grip or knob of the previous embodiment is replaced by a hollow body or casing 28 through which the second component 20 is fixed to the element 200, in particular to the side of the element 200 facing towards the first component 10 and the element 100. The hollow body 28 slides on the main body of the second component 20 from left to right and from right to left as shown in the figures (and thus along a direction substantially parallel to the sliding direction of the end 12), a second helical spring 30 being housed in a suitable seat created between the main body of the second component 20 and the hollow body 28. It can thus be understood that the helical spring 30 pushes the hollow body 28 from right to left in the figures, and thus that the sliding movement of the hollow body 28 from left to right takes place opposing the action of the helical spring 30. A release element 27 is suited to be driven by the hollow body 28 towards the inside of the second component 20 during the translation of the hollow body 28 from left to right.

As in the case of the embodiment described above, during its translation towards the inside of the component 20 the release element 27 pushes the rotatable and translatable element 24 towards the portion of the space 26 in which the distance between the portion 21 and the end portion 12 of the first component 10 is greater, thus allowing the translation of the end portion 12 towards the outside of the second component 20 and thus the mutual release of the first component 10 and of the second component 20 (with the result that the element 100 is released from the element 200). The mutual locking of the first component 10 and of the second component 20, therefore, also in this case is achieved through the insertion of the end portion 12 in the second component 20. In this case, however, the mutual release is obtained by simply acting on the element 200 so as to move it away from the element 100. In fact, in this way, since at the beginning the first and the second element are in a position of mutual locking and are thus constrained to each other, acting on the element 200 so as to move it away from the element 100 first makes the casing 28 slide on the second component 20 (against the action of the spring 30) and then drives the release element 27 that thus pushes the rotatable and translatable element 24 towards the portion of the inner space 26 in which the distance between the portion 21 and the end 12 is greater, until the rotatable and translatable element 24 reaches a position in which its external surface is not any longer or is only slightly in contact with the end portion 12, or at least on which the friction between the external surface of the rotatable and translatable element 24 and the end portion 12 is minimal. In this way, the counteracting action exerted by the element 24 on the end portion 12 is eliminated and thus continuous action on the element 200 to move it away from the element 100 makes the end portion 12 come out of the component 20 and thus releases the two components 10 and 20, as well as the two elements 100 and 200. In order to prevent the portion 21 from hindering or blocking the translation of the release element 27 towards the inside of the component 20, the release element 27 is provided with a suitable seat 29 intended to house the end of the portion 21 facing towards the outside of the component 20 (in this regard, see FIG. 2b).

In the illustrative example of the system according to the present invention illustrated in FIGS. 3a and 3b (in which as usual component parts and/or characteristics already described above are identified by the same reference numbers) the first component 10 is quite similar to the one present in the embodiments previously described and is thus suited to be fixed to a first element 100 (for example a shelf) with one of its ends, while a second end portion is suited to be slidingly housed inside the second component 20. Said second component 20 comprises in this case a lower part I and an upper part S, with a truncated cone-shaped or funnel-shaped seat created in said lower part I in such a way as to define an inner space 26 in which balls 24 are housed so that they can rotate and are arranged in a circle around a centre pin of said truncated cone-shaped seat, elastic thrusting means 23 being interposed between the centre pin and the balls so as to thrust the balls towards the outside of the truncated cone-shaped seat and thus towards the shallower portion of said truncated cone-shaped seat. The upper part S is positioned above the lower part I at a predefined distance, in such a way as to define an air space 25 inside which the end portion 12 of the first component 10 can slide or translate. The lower surface of the truncated cone-shaped seat thus corresponds to the inclined portion 21 that is present in the embodiments described above, so that the mutual action between the balls 24, the lower surface 21 of the truncated cone-shaped seat and the end portion 12 is quite similar to the action that is generated in the embodiments described above, so that the insertion of the end portion 12 of the first component towards the inside of the second component 20 takes place in a way that is almost equal to that described for the previous embodiments. The special feature of this illustrative example, however, lies in that the mutual distance between the upper part S and the lower part I can be changed (in particular, increased) by rotating a knob 28 as indicated by the arrow in FIG. 3b and thus in such a way as to increase the cross section of the seat 25 where the end portion 12 of the first component 10 slides. The release of the first component 10 from the second component 20, and thus of the first element 100 from the second element 200, is obtained by acting on the knob 28 in such a way as to move the upper part S from the position shown in FIG. 3a to that shown in FIG. 3b. With the upper part S in the position shown in FIG. 3b, the end 12, during its translation towards the outside of the second component 20, does not cause the rotation of one or more of the balls 24 so that the same are not driven towards the external part of the truncated cone-shaped seat 26 and no friction or opposing action is generated between the balls 24 and said end 12, so that the same end 12 will be free to exit from the second component 20.

FIGS. 3c and 3d show an example of application and/or use of the illustrative example just described above. In the example of application illustrated above, the first component 10 is fixed to a shelf 100 while the second component 20 is inserted in a post 200, for example a bearing column. The first element 100 is thus fastened to the bearing column 200 by inserting the end of the first component 10 in the air space 25 between the upper part S and the lower part I of the second component 20 while said first element 100 and second element 200 can be released from each other by releasing the two components 10 and 20 of the system proceeding as described above. One of the advantages offered by this illustrative example lies in that several elements 100 can be fastened to the support 200 using a single component 20 and arranging said first elements along the circumference of said single component 20.

The embodiment of the system according to the present invention illustrated in FIGS. from 4a to 4c (in which, as usual, component parts and/or characteristics already described above with reference to other figures are identified by the same reference numbers) can be quite conveniently applied to a container 300, for example a waste container as illustrated in the figures. The same embodiment of the present invention can however be applied, as conveniently as in the former instance, for example, to dumpers or heavy vehicles, agricultural machines and/or building machines etc. In particular, the first component 10 of the system according to the embodiment of the present invention illustrated in FIGS. from 4a to 4c is fixed to the main body 100 of the container 300 while the second component 20 is housed in a suitable seat in the door 200 of said container, said door 200 being constrained to the main body 100 of the container 300 through a revolving constraint 201 like, for example, a hinge. While on the one hand it is necessary to refer to the previous description (in particular, to the description of the first embodiment of the invention illustrated in FIGS. from 1a to 1c) regarding the mutual interaction between the end of the first component 10 and the components housed inside the second component 20 (rotatable and/or translatable element and spring housed in an inner space defined by an inclined surface etc.), since the arrangement of said component parts is substantially identical to that provided in said embodiment previously described, it should be noted that a specific feature of the present embodiment is represented by the fact that inside the second component 20 there is a V-shaped seat 43 that communicates with the inside and the outside of the second component 20 and therefore in particular with the inside and the outside of the container 300. Inside said seat 43 there is a small sphere 42 that is free to move inside the seat 43. In particular, the movement of the small sphere 42 inside the seat 43 takes place thanks to the action of the force of gravity when the user acts on the container 300 and/or the door 200, for example rotating them as indicated by the arrows A and B in the figures. A lever 44 (which, as can be clearly understood from the following description, serves the same function as the knob 28 previously described) is arranged so that a portion of the same is slidingly housed inside the component 20 and is in communication with the release element 27 (not illustrated in the figures for the sake of clarity) while a second portion of the lever 44 is arranged so that its free end is at the level of the opening of the V-shaped seat 43 facing towards the outside of the container 300. On the opposite side of the component 20 with respect to the lever 44, a second rocking lever 40 is revolvingly constrained to the component 20 through a revolving constraint 41 like for example a hinge, so that an end portion of the lever 40 is at the level of the opening of the seat 43 facing towards the inside of the container 300, while the opposite end of the lever 41 is positioned at the level of the release element 27.

The mutual release of the two components 10 and 20 of the system, and thus the opening of the door 200, can therefore be summed up as follows.

Figure 4A:
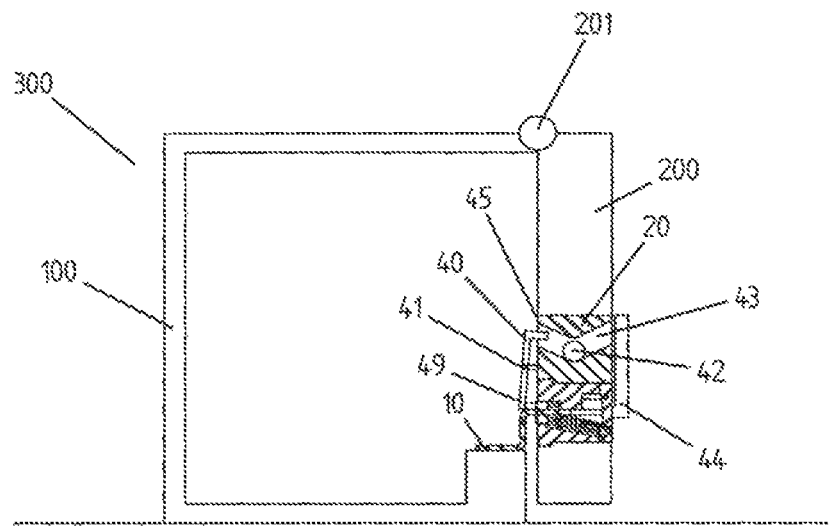
FIGS. 4a, 4b and 4c show each a sectional view of a further embodiment of the system according to the present invention with the first and the second component of said system respectively in a position where they are going to be coupled with each other, in a position where they are going to be released from each other and in the released position.
Figure 4B:
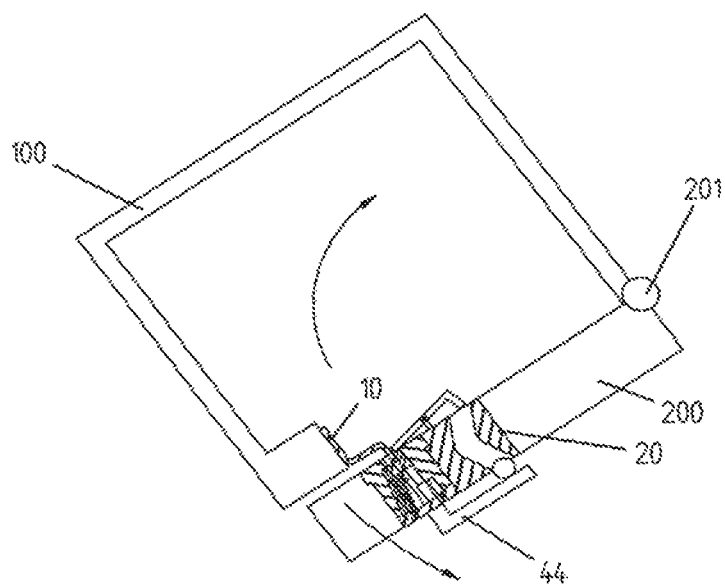
Figure 4C:
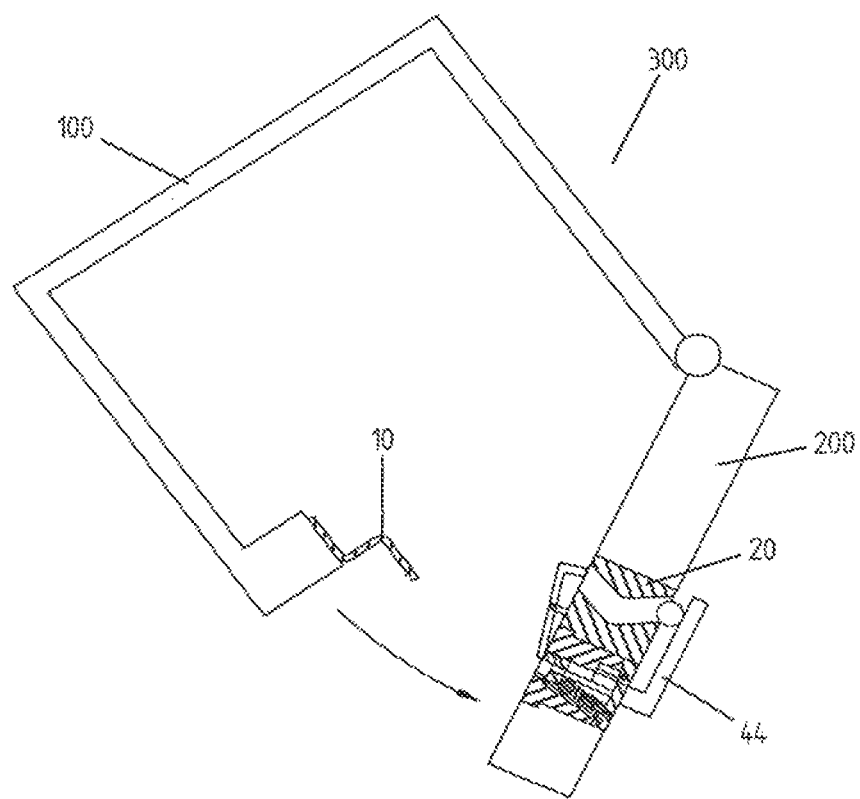

Rotating the container in the direction of the arrow B as shown in FIG. 4b (and thus clockwise) makes the small sphere 42 slide inside the seat 43 towards the external opening of said seat 43 until it hits against the lever 44 that thus is thrust and translated towards the outside of the container 300 and of the second component 20, so that the portion of the lever 44 housed inside the component 20 brings with itself the release element 27 that at this point acts on the rotatable element until this reaches the position in which the friction, and therefore the opposing action generated between the rotatable element and the end portion 12 of the first component 10, is eliminated or at least reduced, thus allowing the mutual release of the first component 10 and the second component 20 from each other. In this way, therefore, always thanks to the action of the force of gravity, the door opens automatically as shown in FIG. 4c, allowing the container to be emptied.

In the same way, acting on the door 200 so as to rotate it in the direction of the arrow A in FIG. 4a means obtaining first the at least partial rotation of the entire container 300 in the same rotation direction (anticlockwise), the first component 10 and the second component 20 being constrained to each other. Continued rotation of the door 200 (and/or of the entire container) in the same rotation direction makes the small sphere 42 move by gravity inside the seat 43 towards the opening in the seat 43 facing towards the inside of the container and thus hit against the end of the rocking lever 40 positioned at the level of said opening. The impact of the small sphere 42 against the end of the rocking lever 40 causes the latter to rotate around the constraint 41 so that the second end of the rocking lever is pushed towards the inside of the component 20 bringing the release element 27 with itself in its pushing movement. At this point the first and the second component 10 and 20 are mutually released from each other and it is thus possible to open the door 200. It appears evident from the above that a considerable advantage offered by this embodiment lies in that the mutual release of the components 10 and 20 of the system (and thus the release of the door 200 from the main body of the container 100) is obtained by acting directly either on the door or on the container, and therefore with no need for any direct action on one of the two components of the system.

Figure 5A:
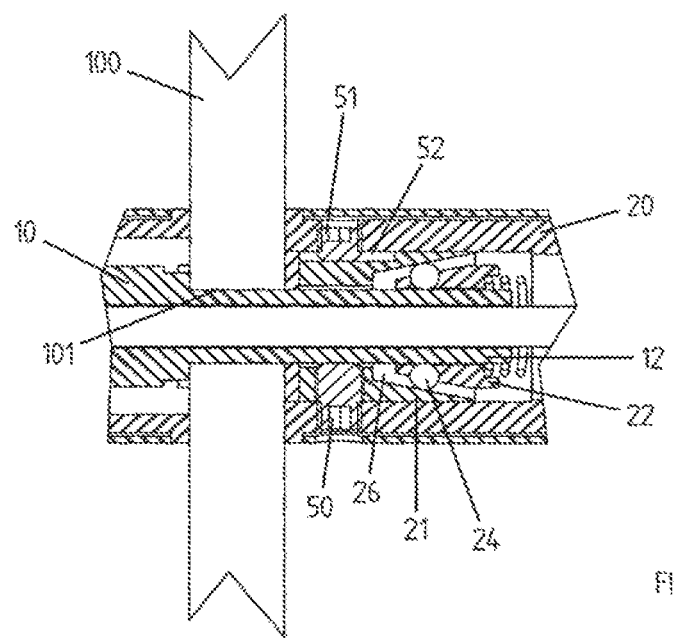
FIGS. 5a and 5b show each a sectional view of an illustrative example of the system according to the present invention with the first and the second component of said system respectively in the coupling position and in a position where they are going to be released from each other.
Figure 5B:
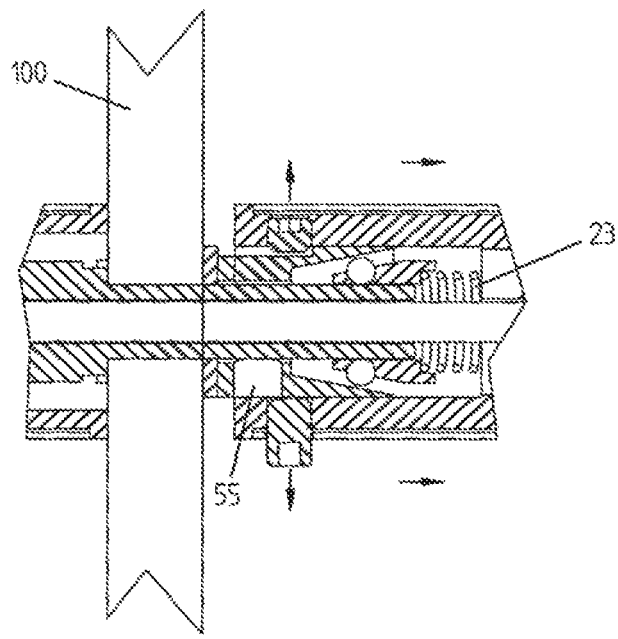

An illustrative example of the system according to the present invention is described here below with reference to FIGS. 5a and 5b.

In this illustrative example, the first component 10 of the system has the shape of a hollow tubular element suited to be inserted and partially housed in a proper seat 101 in a first element 100. The second component 20 is constituted by a hollow body suited to house the end portion 12 of the first component 10, end that in this case extends on one side of the first element 100 (on the right in FIGS. 5a and 5b). A portion of said end 12 defining a truncated-cone shaped surface 22 whose diameter decreases towards the first element 100 extends from the external surface of the end 12 of the first component 10. In the same way, the second component 20 comprises a truncated-cone shaped portion 21 that defines a truncated-cone shaped surface opposite the truncated-cone shaped surface 22, so as to form an air space 26. On the truncated cone-shaped surface defined by the truncated cone-shaped portion 22 there is a circumferential groove housing rotatable elements like balls or similar elements. The first component 10 also comprises a radial seat 55 in which a dowel 50 is engaged, said dowel 50 being provided with an external thread that in turn engages with the internal thread of an engagement seat of the dowel, said seat being obtained in the second component 20. A second dowel 51 is screwed into a threaded engagement seat of the second component 20 so that the end of said dowel 51 projecting towards the inside of the second component 20 becomes engaged in a sliding seat 52 obtained on the external surface of the first component 10. A helical spring 23 is interposed between the first component 10 and the second component 20 as shown in FIG. 5b, and in particular in such a way as to thrust the second component 20 towards the first element 100, and thus from right to left in FIGS. 5a and 5b. The function of the spheres 24, of the truncated cone-shaped surfaces 21 etc. is similar to that of the corresponding parts provided in the embodiments previously described, therefore the detailed description of said function is omitted for the sake of brevity, simply specifying that the mutual locking of the first component 10 and the second component 20 takes place thanks to the counteracting action between the balls and the corresponding truncated cone-shaped surfaces, in such a way as to prevent the first component 10 from withdrawing from the second component 20 sliding towards the outside of the second component 20, in particular from right to left in FIGS. 5a and 5b. In the case of this embodiment, the sliding movement of the second component 20 with respect to the first component 10 in the opposite direction (release), and thus in the direction in which the second component 20 would move away from the element 100, is prevented also by the dowel 50 that, as previously explained, becomes engaged in a seat obtained in the first component 10. In order to obtain the mutual release of the first component 10 and of the second component 20, and thus to move the second component 20 away from the element 100, it is necessary to act on the dowel 50 so as to make it exit from the engagement seat 55. (The dowel thus serves a further safety function against any accidental release). At this point, the component 20 can be moved away from the element 100 (translating it from left to right as shown in FIGS. 5a and 5b) until reaching the final position defined by the engagement of the second dowel 51 in the engagement seat 52 obtained on the external surface of the end 12 of the first component 10. With the second component 20 in this final position, the space between the two truncated cone-shaped surfaces will increase, as shown in FIG. 5b, and thus the friction and the opposing action between the balls 24 and the external surface of the end portion 12 are eliminated, so that said end portion 12 can be withdrawn from the component 20 from right to left as shown in FIGS. 5a and 5b, so as to obtain the mutual release of the two components 10 and 20. Furthermore, the dowel 50, becoming engaged in the engagement seat 55 with its end, serves the further function of exerting a compression force on the external surface of the first component 10, avoiding troublesome slacks and/or mutual movements between said first component 10 and said second component 20.

Figure 5C:
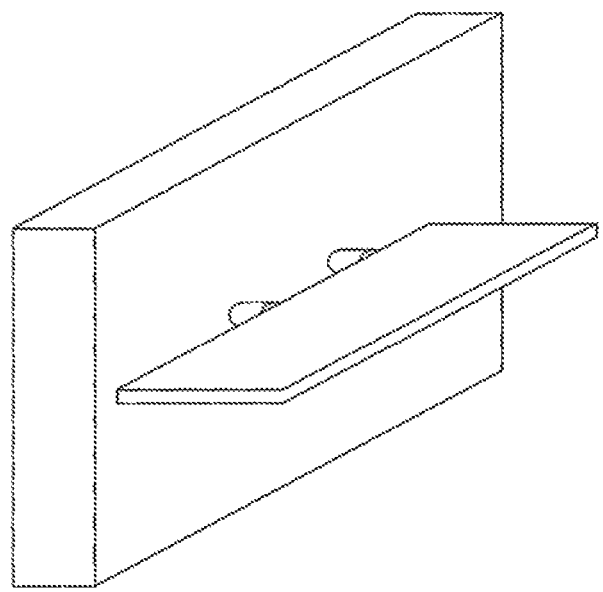
FIGS. 5c, 5d and 5e show an example of use of the system according to the illustrative example of the present invention illustrated in FIGS. 5a and 5b.
Figure 5D:
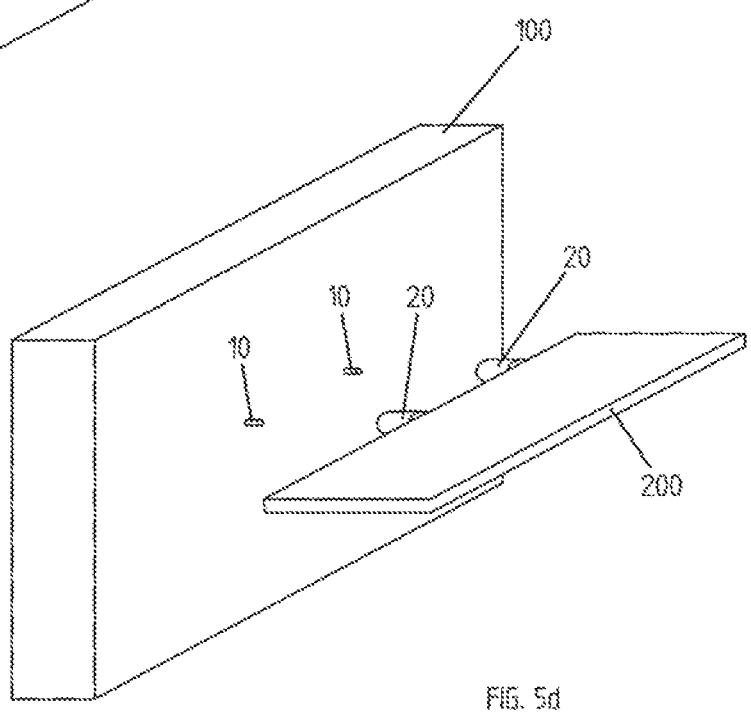

FIGS. 5c and 5d schematically show one of the possible uses of the illustrative example just described, in particular the use of the system according to said illustrative example of the present invention for fixing, for example, a shelf 200 to a supporting wall 100. In fact, it can be observed in particular in FIG. 5d that two first components 10 of the system can be fixed to the wall 100 so that they project from the same, while two components 20 can be fixed to the edge of the shelf (but even under the shelf) facing towards the wall 100 in such corresponding positions that moving the shelf 200 towards the wall 100 inserts each one of the two first components 10 in a corresponding component 20 until they reach the mutual position shown in FIG. 5a, where it is fixed by acting on the dowel 50.

Figure 5E:
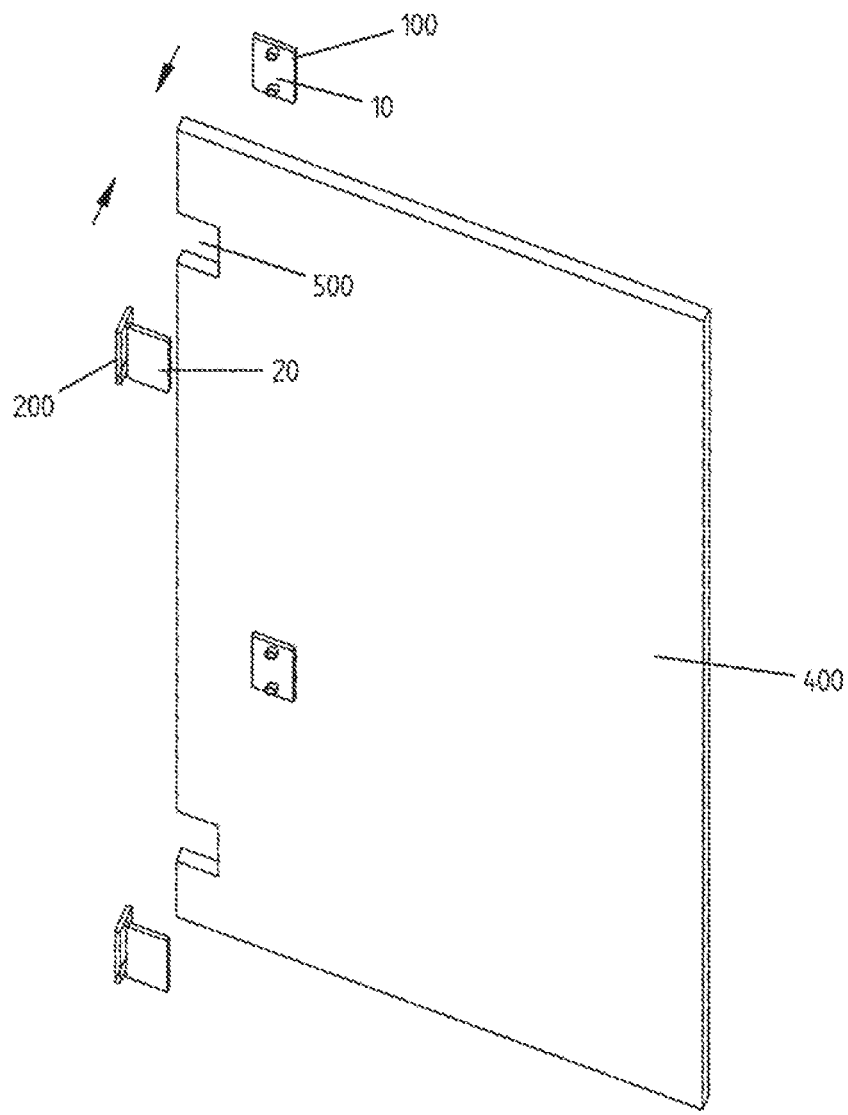

A second use of the illustrative example of the system according to the present invention just described is schematically illustrated in FIG. 5e, in which a hinge intended to revolvingly constrain a door or window to a frame is made up of two elements 100 and 200, a first component 10 of the system being fixed to the first element 100 so that it projects from the same, while a second element 20 of the system is revolvingly fixed to a second element 200 in turn intended to be fixed to said frame. The two components of the system are then positioned on the two opposite faces of the door/window panel 400 at the level of a suitable opening 500 with the first component 10 that extends through said opening 500, and then fixed and constrained to each other through the insertion of the first component 10 in the second component 20. With the first and the second component 10 and 20 mutually fixed to each other and also to the door/window panel 400 as just described, the element 200 can be fixed to the frame (for example through screws or similar fastening means). Therefore, as the second component 20 is revolvingly fixed to the element 200 (for example, through a hinge), the door/window panel 400 is revolvingly constrained to the frame.

In the embodiment shown in FIGS. from 6a to 6d, the system according to the present invention is carried out in the form of a handle comprising a sliding bolt, a hand grip or knob P and a portion M intended to be fixed to a door or window, for example to be housed in a suitable seat provided in said door or window. In particular, the sliding bolt is made with the first component 10 of the system, a first end of said first component 10 being suited to be engaged in a groove in a doorpost St, the opposite end of said first component 10 being slidingly housed (from left to right and vice versa in the figures) inside the second component 20. In particular, thanks to the action of a helical spring E, the bolt or first component 10 is maintained in an extended position by the second component 20, any sliding movement of the bolt or first component 10 towards the inside of the second component 20 being prevented by the counteracting action exerted on the external surface of said first component or bolt 10 by a rotatable and/or translatable element 24 housed in a seat 26 defined by said external surface of said bolt or first component 10 and an inclined or tapered surface 21 defined by the second component 20 (as it occurs in the case of the other embodiments). As already explained, the helical spring 23 pushes the rotatable element (small cylinder, pawl, ball etc) in the sliding direction of the bolt 10 towards the inside of the second component 20, and thus towards that portion of the space 26 in which the distance between the external surface of the bolt 10 and the inclined or tapered surface 21 decreases. In the locking position shown in FIG. 6b, in which the bolt is locked with respect to the second component 20, the sliding movement of the bolt 10 towards the inside of the second component 20 is prevented as the bolt 10, being translated towards the inside, would set the rotatable element 24 rotating and/or translating by moving it towards the inside of the second component 20 and thus towards that portion of the space 26 in which the distance between the surface 21 and the external surface of the bolt 10 decreases, thus originating that counteracting force that prevents the translation towards the inside of the bolt 10, in a way almost equal to that described with reference to the previous embodiments. In the position in which the bolt 10 is locked with respect to the component 20, as the external end of the bolt 10 is housed inside the housing or engagement seat of the doorpost St, any mutual movement of the system (and thus of the door panel) with respect to the doorpost is impossible, so that the door/window panel is locked in the closed position. The door/window can thus be opened only by releasing the bolt 10 so that the same can slide towards the inside of the second component 20, wherein the release of the bolt 10 can be summed up as follows. It can be seen in FIG. 6d that the knob P is connected to a portion Pi slidingly housed inside the second component 20, said portion comprising a groove Sc (V-shaped if seen from above) that comprises in particular two counteracting surfaces Sc2 and Sc1, perpendicular to the plane of FIG. 6d, which when the knob P is moved in a predefined direction (respectively moving it away from or moving it near the door) strike against the element 24 and move (thrust) it towards that portion of the space 26 in which the distance between the inclined surface 21 and the external surface of the bolt 10 is greater. In this way, during the translation of the bolt 10 towards the inside of the component 20, the rotatable element 24 is no more thrust or moved towards that "narrow" part of the space 26 in which the distance between the surface 21 and the external surface of the bolt 10 decreases and cannot become engaged between the surface 21 and the external surface of the bolt 10, so that no counteracting action against the translation of the bolt 10 towards the inside of the component 20 is generated, said counteracting action, instead, being generated when the groove Sc is in the position shown in FIG. 6b. Thus, moving the knob P away from the door/window (or even moving it near the latter) releases the bolt 10 from the second component 20, so that the end of the bolt 10, during the rotation of the door/window (or the translation, for example, of a drawer) strikes against the internal wall of the groove provided in the doorpost, and thus is pushed towards the inside of the component 20, thus allowing the door/window panel to be released from the doorpost St and thus allowing the door/window to be opened. It can thus be inferred from the above description that, even in the case of this embodiment of the system according to the present invention, the two elements (in this case the doorpost and the door/window panel), constrained to each other by means of the system according to the present invention, can be released through the same operation by means of which it is possible to obtain the mutual release of the first component 10 and of the second component 20 of the system itself.

In other words, both pulling and pushing the knob P in the opening direction of the door/window achieve the release of the two components of the system (handle) and thus practically at the same time the opening of the window/door.

A further embodiment of the present invention is schematically shown in FIGS. 7a and 7b, said embodiment comprising a rocking lever 40 easily constrained to the second component 20 through a revolving constraint (for example, a hinge) 41, a first end 48 of the rocking lever 40 being positioned at the level of an electrically powered solenoid 60, the end 49 of the rocking lever 40 opposite the end 48 being positioned at the level of the release element 27. The action of the solenoid consists in moving the rocking lever, in particular in rotating it in a first rotation direction (anticlockwise with respect to FIGS. 7a and 7b) so that the end 49 becomes engaged with the release element 27 pushing it towards the inside of the second component 20 in such a way as to mutually release the first component 10 (its end housed inside the second component 20) and the first component 20. In the same way, the solenoid 60 can be operated or powered electrically, so as to obtain the rotation of the rocking lever 40 in the opposite direction (clockwise with respect to FIGS. 7a and 7b) and thus to translate the release element 27 towards the outside of the component 20, finally obtaining the mutual locking of the component 10 and the component 20.

In other embodiments, not described herein for the sake of brevity, the actuator element, constituted by the solenoid 60, can be replaced by any other actuator system suited to perform a similar function, like for example a piston, a compressed air jet, a mechanical moving mechanism with a motor or any electrical or automated mechanism.

A further example of application of the locking and/or fastening system according to the present invention is illustrated in FIGS. from 8a to 8c, in which, as usual, component parts and/or characteristics of the system already described above with reference to other figures are identified by the same reference numbers.

In the figures, the reference numbers 100 and 200 identify respectively the supporting disc of a wheel (for example, of a car) and the rim of the wheel. Threaded bolts usually project from the supporting disc and are suited to be housed in a corresponding hole in the rim, the fastening of the wheel being achieved through the engagement of a corresponding threaded nut in each one of the bolts. The embodiment of the system according to the present invention illustrated in FIGS. from 8a to 8c is proposed as an alternative to the fastening of the wheel with bolts and nuts.

For this purpose, four first components 10 (but the number may vary depending on the needs and/or circumstances) are fixed to a first element 100 (corresponding to the wheel's supporting disc), each one of said first components 10 being partially housed in a housing seat of said first element 100, so that an end portion 12 of each first component 10 projects from said first element 100, in particular on the side of the element 100 to which the second element or rim 200 will be applied. In particular, the second element 200 is fixed to said first element 100 by engaging in each first component 10 a second component 20 (which thus replaces the classical nut known in the art) proceeding as described below. For the sake of brevity, the description provided below concerns a first component 10 and a corresponding second component 20, as well as their mutual locking and release, the following description being applicable to each one of the first and second components 10 and 20 shown in the figures.

The projecting end portion 12 of the first component 10 has a slightly truncated cone-shaped longitudinal section, with the diameter of the cross section decreasing towards the first element 100, said end portion being suited to be housed and translated inside a space 26 defined by the second component 20. In particular, also said inner space 26 has a truncated cone-shaped longitudinal section, the inner diameter of said space 26 decreasing towards the first element 100, too, and thus from right to left in FIGS. 8b and 8c. Once again, an air space is thus defined between the external truncated cone-shaped surface 22 of the end 12 of the first component 10 and the internal truncated cone-shaped surface 21 of the space 26 of the second component 20.

Furthermore, the inner space 26 partially houses, on the opposite side with respect to the end 12 of the first component 10, a hollow body 28, which in turn partially houses the end 12 of the first component 10. In particular, said hollow body is suited to slide inside the space 26 and on the end 12 of the first component 10. On the external surface of the hollow body 28 (in particular, on the external surface of the portion of the hollow body 28 housed inside the space 26) there is a circumferential groove housing a plurality of balls 24 that are thus arranged so as to form a crown outside the hollow body 28. A helical spring 23 is arranged outside the hollow body 28, said helical spring 23 being in particular housed between the external surface of the hollow body 28 and the internal surface 21 of the second component 20 that defines the space 26. In particular, a first end of the spring (facing towards the first element 100) is arranged so that it strikes against an external annular projection of the hollow body 28, while a second end of the spring 23, opposite said first end, is arranged so that it strikes against an annular projection of the second component 20. The function of the helical spring 23 is thus to maintain the hollow body 28 pushed towards the first element 10 (towards the left in FIG. 8c), and therefore with the balls 24 pushed towards that portion of the space 26 in which the distance between the internal surface 21 and the external surface 22 decreases.

Figure 8A:
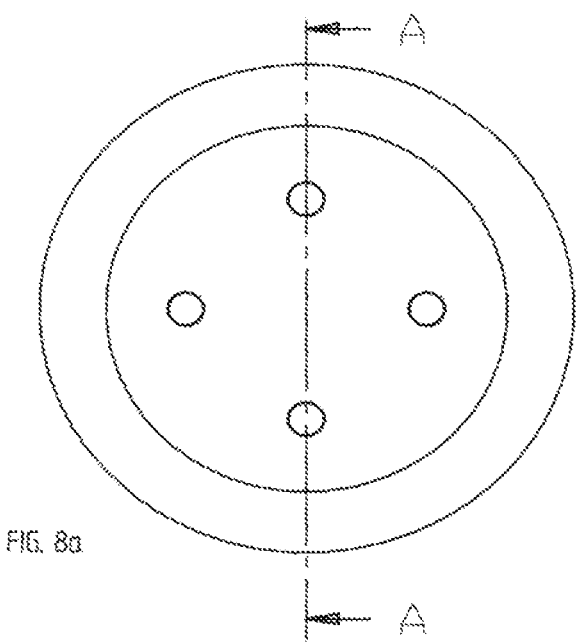
Figure 8B:
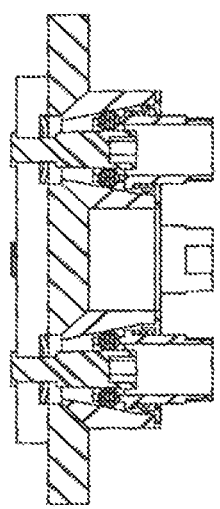
Figure 8C:
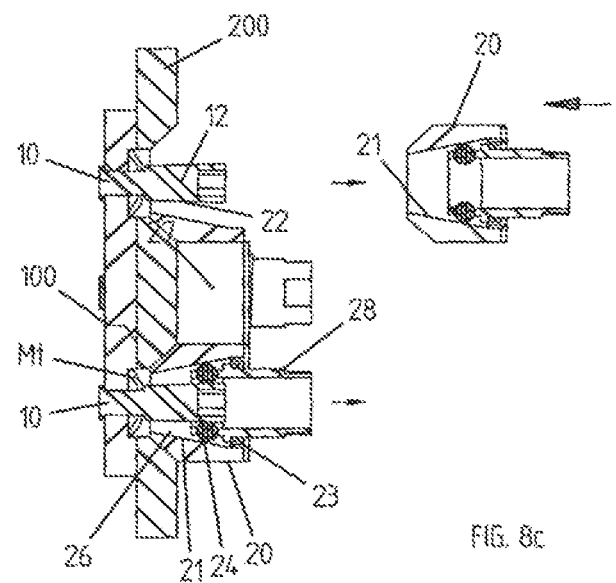
Figure 13A:
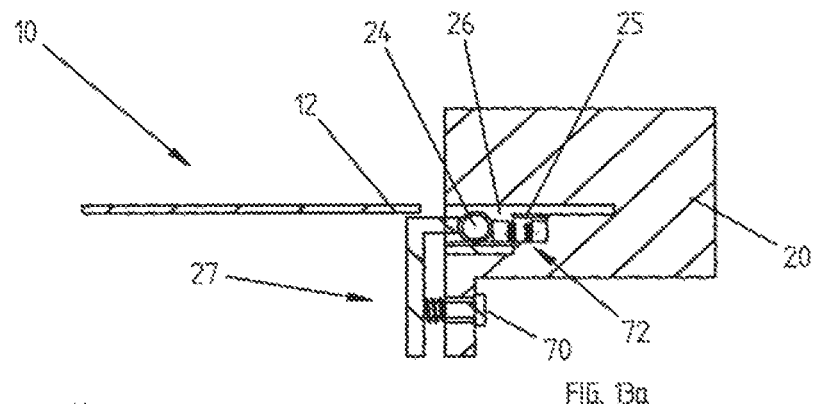
Figure 13B:
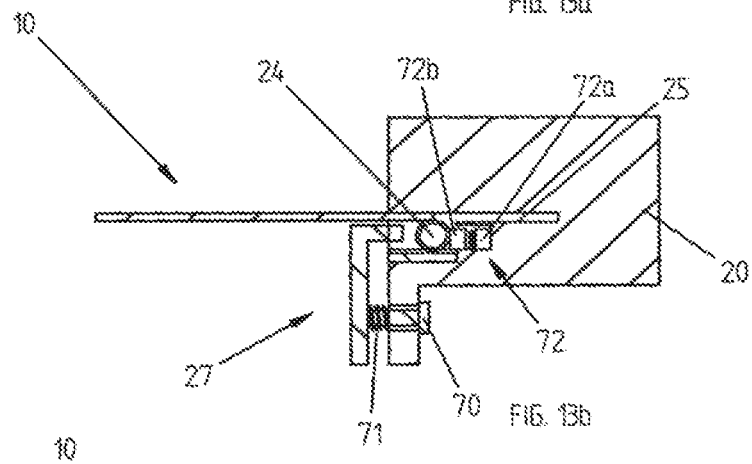
Figure 13C:
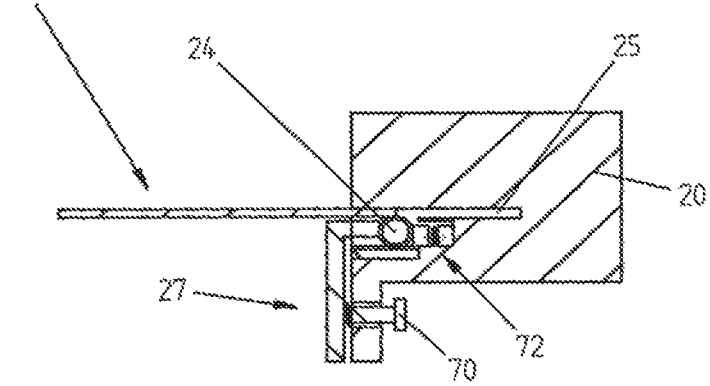

The assembly position of the rim 200 on the supporting disc 100, as well as the mutual locking position of the first components 10 and the second components 20 is the one shown in FIG. 8b. It can in fact be inferred from this figure that the rim 200 has been applied to the disc 100 in such a way that each one of the first components 10 is received and housed in a corresponding through hole in the rim 200. Furthermore, a Belleville washer Mt (whose function is explained below) has been inserted between the rim 200 and the disc 100 at the level of each one of the first components 10, which means that the end 12 of each component 10 will be partially housed in the through hole of a corresponding Belleville washer Mt interposed between the disc and the second component 20. In the mutual position shown in FIG. 8b, the second component 20 and the first component 10 are rigidly constrained to each other, and thus the rim 200 is rigidly fixed to the supporting disc 100. In fact, in the position shown in FIG. 8b, the helical spring maintains the balls 24 in the portion of the space 26 in which the distance between the surfaces 21 and 22 is shorter.

Therefore, any attempt to remove the second component 20 from the corresponding first component 10 (pulling it to the right as shown in FIG. 8b so as to withdraw it from the first component 10) would be nullified by the counteracting action mutually exerted by the balls 24 and the surfaces 21 and 22, as the balls 24, becoming engaged between said two surfaces, would prevent any translation movement to the right of the second component 20 (in a way similar to the case of the previous embodiments) which thus could be neither moved away from the rim 200 nor removed from the first component 10. The release of the second component 20 from the first component 10 is also possible through an action exerted on the hollow body 28 in the following way. Pulling the hollow body 28 towards the outside of the second component 20 (of the space 26) in the direction left-right indicated by the arrow in FIG. 8c in such a way as to compress the helical spring 23 as shown in the figure repositions the balls 24 in a portion of the space 26 in which the distance between the surfaces 21 and 22 is longer, and thus in such a way as to reduce or even eliminate the mutual friction between said surfaces 21 and 22 and the balls 24. This also eliminates the counteracting force that opposes the sliding movement of the component 20 on the component 10 from left to right in the figures. The component 20 can thus be withdrawn from the component 10 as shown in particular in FIG. 8c. Withdrawing each component 20 as just described above from the corresponding component 10 makes it possible to finally release and remove the rim 200 from the supporting disc 100. The function of the Belleville washers Mt is thus to favour the reinforcement of the mutual constraint between the second component 20 and the first component 10. In fact, each Belleville washer Mt acts on the corresponding second component 20 so as to push it in the direction in which the same would move away from the corresponding first component 10; as just explained, however, any thrusting action in this direction (without acting on the hollow body 28 by pulling it as just described) has only the effect of engaging and fixing the balls 24 between the surfaces 21 and 22 even more firmly, preventing any further translation of the second component 20 and eliminating even the slightest slack that may hypothetically be present.

A further embodiment and a further example of application of the system according to the present invention are described below with reference to Figures from 9a to 9c.

The same FIGS. from 9a to 9c show a first and a second portion of a pipe 100 and 200 (here below respectively defined also as first and second element). Said first and said second element are connected to each other by means of the embodiment of the system according to the present invention illustrated in FIGS. from 9a to 9c, in such a way as to obtain a continuous pipe, that is, in such a way as to make the inner flow sections of said first and second element 100 and 200 coincide. For this purpose, a first component 10 is fixed to a free end of the first element 100, while a second component 20 is fixed to a free end of the second element 200, so that the mutual fastening of said first and said second element 100 and 200 is obtained by constraining said first and said second component 10 and 20 to each other. For this purpose, both the first component 10 and the second component 20 comprise a tubular end suited to be inserted in the end portion respectively of said first and said second element 100 and 200 and fixed to it, for example by means of clamps or similar fastening means.

In particular, the first component 10 is provided with a first duct 12t and comprises one end 12 (opposite said end fixed to the component 100) that is substantially spherical in shape; in turn, the second component 20 is provided with a second duct 20t and comprises one end (opposite the end fixed to the element 200) that is substantially cylindrical and is suited to house said spherical end 12 of said first component 10. In greater detail, inside the cylindrical end of the second component 20 there is a sealing element (suited to prevent fluid leakages) that defines a substantially spherical inner space 26 suited to house said substantially spherical end 12 of said first component 10. Furthermore, said second component 20 comprises also a hollow body 28 that is fitted on the cylindrical end of the component 20 opposite the element 200 and is suited to slide on said cylindrical end of the component 20 in the longitudinal direction (from top to bottom and vice versa in the figures). In particular, the hollow body 28 comprises an external wall suited to slide on the external surface of the cylindrical end of the component 20 and an internal wall suited to slide on the internal wall of the cylindrical end of the component 10, as well as a transversal wall connecting said internal and external walls of the hollow body 28. This means that the end of the cylindrical wall of the component 20 is housed in a U-shaped seat in said hollow body, defined by its external, internal and transversal walls. Between the hollow body 28 and the cylindrical end of the component 20 there are helical springs 23 (in a number as desired) suited to exert a thrusting action on said transversal wall of said hollow body 28 in a direction parallel to the translation direction of the hollow body 28 with respect to the second component 20 (towards the bottom in the figures). Furthermore, inside the component 20, in particular between its internal surface (comprising a tapered or truncated cone-shaped portion 21, the one in lower position in FIG. 9b) and the external surface of the end 12 of the component 10, as well as above the internal wall of the hollow body 28, there are balls 24 in a number as desired and substantially arranged in a circle around said spherical portion 12 of said first component 10. The mutual locking position of the first component 10 and the second component 20 is the one shown in FIG. 9b. In this position, in fact, the spherical end 12 of the first component is housed inside the seat 26. Furthermore, thanks to the action of the springs 23, the hollow body is maintained in the position of maximum extension (pushed downwards in FIG. 9b) with respect to the component 20 (its hollow main body), a position in which the balls 24 are positioned beyond the portion with maximum diameter of the spherical end 12 of the first component 10. In this position, any attempt to extract the spherical end 12 from the hollow seat 26 would only result in thrusting the balls 24 towards the outside; however, in this way the balls would be moved towards the outside of the hollow seat 26, along the tapered surface 21, and thus the balls would get fixed between the spherical end 12 and said tapered surface 21, thus preventing any further translation of the end 12 towards the outside of the hollow seat 26. To obtain the mutual release of the first component 10 and the second component 20, however, it is sufficient to intervene on the hollow body 28, as shown in FIG. 9c, thus thrusting it towards the main body of the second component 20 opposing the action of the springs 23. In this way, the balls 24 are thrust by the internal wall of the hollow body 28 and moved by the same wall between the external surface of the end 12 and the tapered surface 21 towards that portion of the internal space of the component 20 in which the distance between the tapered surface 21 and the external surface of the end 20 is longer, that is, in such a way that the balls can move beyond the portion of the spherical end 12 with maximum diameter. At this point, if the spherical end 12 of the first component 10 is pulled in the extraction direction, said spherical end does not meet any longer the resistance generated by the opposition between the balls 24, the tapered surface 21 and its external surface but it is free to move out of the hollow seat 26.

It should be underlined that the articulated spherical shape shown in the example ensures safe fastening, although allowing movement and rotation in more than one direction in an articulated manner.

It should be specified that in the embodiments of the invention previously described the angle of inclination of the portion 21 (of its upper surface in contact with the rotatable and translatable element 24, be it flat or truncated cone-shaped etc) can be selected according to the needs and/or circumstances. Tests carried out using the system that is the subject of the invention have given the following results, depending on the different angles. With an angle included between 1° and 8° (see FIG. 9d) a safe locking is obtained, of the conical clamping type; on the other hand, in this case the release operation becomes more difficult. This angle, therefore, is particularly convenient in case of use of the system of the invention on the hub of a wheel. With angles included between 8° and 16° (preferably 12°, see FIG. 9e) an optimal (safe) locking result can be obtained but the release is facilitated, in fact it is sufficient to exert a limited (if not even negligible) force on the release component. These angles are thus particularly suitable for handles, for example the handles of standard doors. Choosing an angle included between 16° and 45° (FIG. 9f) it is possible to set a holding force (threshold) between the two components 10 and 20, so that once said predetermined force threshold (a function of the selected angle) has been exceeded, the system opens even if no action is exerted on the release lever. With such angles, in fact, a sliding or frictional movement of the piece is obtained and thus the system operates as a connector or block with a predefined load. These angles are thus particularly suitable for the application of the system according to the present invention to doors or door/window panels, in particular those which need a predetermined thrust in order to be opened. The selection of the angle (and thus of the force that maintains the rotatable and translatable element pushed) thus depends on the type of constraint to be obtained between the two components 10 and 20.

Obviously, the angle values mentioned above with reference to Figures from 9*d* to 9*f* can be applied to all the embodiments of the present invention described in the present patent application, as well as to all the variants of the same that appear obvious to any expert in the art.

Here below, further embodiments of the present invention and/or component parts of the same are described with reference to FIGS. from 10*a* and 10*b* to 18, in which, once again, component parts and/or characteristics of the system according to the present invention already described above with reference to other figures are identified by the same reference numbers.

The special feature of the embodiment illustrated in FIGS. 10*a* and 10*b* lies in the shape of the portion 21. In fact, it can be inferred from the figures that in this case the portion 21 is characterized in that it comprises a convex upper surface (the one in contact with the rotatable and/or translatable element 24), that is, defined by a lowered portion of said upper surface. In particular, the convex upper surface is defined by two flat and adjacent surfaces P1 and P2 that converge in a common vertex and are inclined by a predefined angle with respect to a horizontal reference surface (the same angle or even two different angles). Furthermore, the depth of the lowered portion varies along the length of the portion 21, in particular it decreases towards the end of the portion 21 that faces (in the complete system) towards the first component 10. Therefore, when the end 12 of the component 10 translates towards the outside of the second component 20 as described with reference to other embodiments, the rotatable and translatable element 24 is moved (thanks to the friction between the end 12 of the first component 10, the element 24 and the convex upper surface of the portion 21) towards the outside of the second component 20, too (from bottom to top in FIG. 10*b*) and thus "ascending" along the convex surface, until stopping along its path, thus preventing any further translation of the end 12 of the first component 10, so that the first component 10 cannot be extracted from the second component 20.

A further variant embodiment of this solution is illustrated in FIGS. 11*a* and 11*b* and differs from the solution just described with reference to FIGS. 10*a* and 10*b* in that in this solution it is not the depth of the lowered portion of the upper surface of the portion 21 that varies over the length of the portion 21 but rather the mutual distance (in the horizontal direction in FIGS. 11*a* and 11*b*) between the adjacent and opposing inclined surfaces P and P2; in particular, the distance between said surfaces P1 and P2 decreases towards the external end of the second component 20 and thus in the direction of extraction of the first component 10 from the second component 20. The counteracting element 24, when pulled by the end portion 12 of the first component 10 towards the outside of the second component 20 (from bottom to top in FIG. 11*b*) is pushed increasingly upwards (against the end 12 of the component 10) and thus increases the opposing action between the end 12 of the component 10, the element 24 and the portion 21, until causing the mutual locking of said three component parts, thus preventing any further translation of the first component 10 towards the outside of the second component 20 (mutual locking of the first component 10 and second component 20).

It is obvious that the portions 21 according to the two solutions just described above, respectively with reference to FIGS. 10*a*, 10*b* and 11*a*, 11*b*, can be used as an alternative to the inclined portions 21 of the embodiments previously described, as well as of the further embodiments that are described below. It is also obvious that the two solutions just described can be used also in combination with the inclined portion 21 of both the previous embodiments and those described below; in this case, the portion 21 is both inclined and provided with an upper surface with a convex lowered portion having variable depth and/or width.

The special feature of the further embodiment of the invention illustrated in FIGS. from 12*a* to 12*c* (which show the system respectively open, locked and released) is represented, instead, by the shape and operation of the release element 27. In this case, in fact, said release element 27 is L-shaped and has a first end portion positioned at the level of the seat 26 (so that it can be housed at least partially inside said seat 26 during the movement of the element 27 itself) and a second portion that extends from said first end portion.

An elastic counteracting element (for example, a helical spring) 71 acts on said second portion of the release element 27 so as to maintain it in a rest position (shown in FIG. 12*a*), in which the release element is maintained at a given distance from the second component 20, with the first end portion of the release element 27 far from (and not in contact with) the rotatable and translatable element 24. The elastic element 71 thus exerts a thrusting action from right to left in the figures. The release of the system is thus obtained by exerting a thrusting action on the element 27, opposing the thrusting action exerted by the element 71 (from left to right in the figures). In this way, the first end portion of the release element 27 strikes against the rotatable and translatable element 24, thus thrusting it towards the inside of the component 20 opposing the action of the spring 23, and thus towards that portion of the internal space 26 in which the translatable element has more "slack" and is thus substantially "loose" between the end 12 of the component 10 and the portion 21, be it inclined and/or provided with an upper surface with a convex and/or tapered lowered portion. In this way, the end portion 12 of the first component 10 can be extracted from the second component 20 (translated from right to left in the figures) as in the case of the other embodiments. It should also be added that the elastic element 71 is fitted on and kept in position by an element or pin 70 (with variable cross section depending on the needs and/or circumstances) that can be translated inside a corresponding housing seat obtained in the component 20.

The further embodiment shown in FIGS. from 13*a* to 13*c* is quite similar to the one just described with reference to FIGS. from 12*a* to 12*c* but differs from it (and from those described above and below) in that, in this further embodiment, the elastic element or spring 23 is replaced by a magnet 72.

Said magnet 72 comprises in particular two portions having the same polarity (positive as indicated in the figures, or negative, depending on the cases), of which a first portion is firmly fixed to the translatable element 24, while a second portion is firmly fixed to the second component 20. The magnetic force generated between the two portions will thus tend to push towards the outside of the component 20 (from right to left in the figures) the portion of the magnet 72 that is firmly fixed to the element 24, and thus the same element 24 in the same direction towards the outside of the component 20. Therefore, when a thrusting action is exerted on the release element 27 in such a way as to move its first end portion until it strikes against the rotatable and translatable element, said thrusting action is exerted against the action of the magnetic force instead of against the action of an elastic element as in the embodiments described above.

Figure 14A:
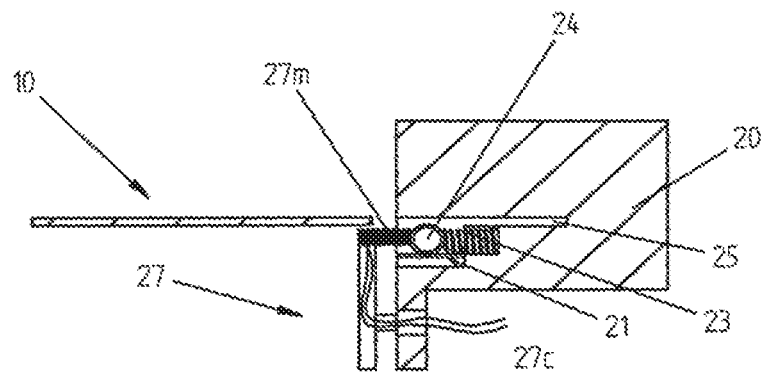
Figure 14B:
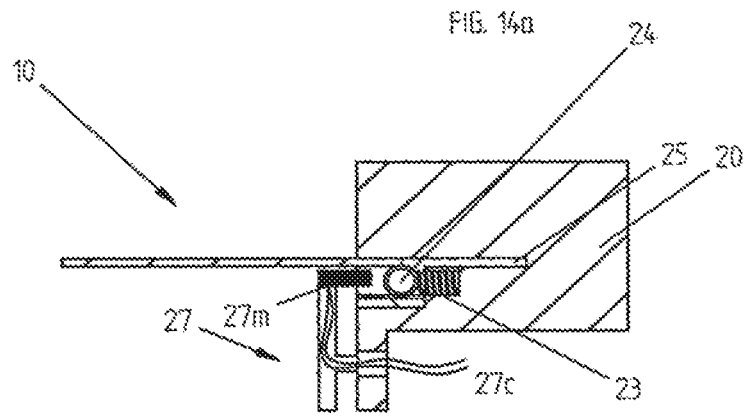
Figure 14C:
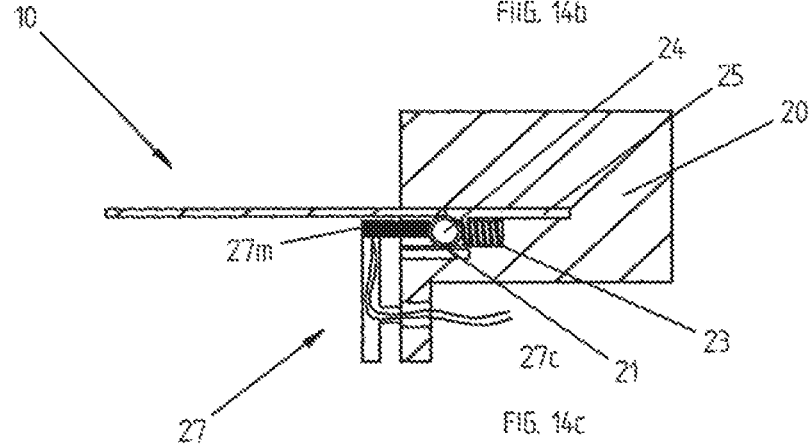

In the further embodiment illustrated in FIGS. 14a and 14b, which respectively show, as in the previous cases, the conditions of the system according to the present invention in which the two components 10 and 20 are respectively released from each other, constrained to each other and suited to be released from each other, the release element 27 is characterized in that its first end portion 27m (the one intended to rest against the rotatable and translatable element 24) is made of a material (for example, a metal alloy) of the so-called "memory form" type, that is, such a material that the volume of said first end portion 27m varies depending on whether said end portion is placed under voltage or not. In the figures, in fact, it is possible to observe the schematic representation of two electric wires by means of which the first end portion 27m of the element 27 can be electrically powered. Owing to the power supply, the first end portion 27m of the element 27 is placed under voltage and thus its volume increases so that the same comes into contact with the rotatable and translatable element 24, thrusting it towards the inside of the component 20, so that it is possible to extract the component 10 from the component 20. On the contrary, if the power supply is eliminated, said first end portion 27m of the release element 27 returns to its initial or rest volume, and therefore it does not exert a thrusting action any longer on the rotatable and translatable element that, if driven towards the outside of the component 20 by the component 10 (by its end portion 12), is locked between the end 12 and the portion 21, thus preventing the mutual release of the two components 10 and 20.

The further embodiment according to the present invention shown in FIGS. from 15a to 15c is similar to the one just described; the difference between the two embodiments lies in that the release element 27 (its second portion that extends from the first end portion) is constrained to the component 20 through a constraint element 27mi, as well as in that, in this case, it is said constraint element 27mi that is made of a memory form material. Therefore, alternatively supplying and taking voltage to/from the constraint element 27mi (through the electric wires 27c) alternatively increases the volume of the constraint element and returns the latter to the "rest" volume, so that the release element 27 is alternatively removed from and moved near the component 20, and the rotatable and translatable element 24 is alternatively pushed towards the inside of the component 20 (from left to right in the figures) and released from the first end portion of the release element 27.

In the embodiment shown in FIG. 16 the special feature is represented by the shape of the component 10 that is characterized by such a longitudinal section that its thickness (or at least the thickness of its end portion 12 intended to be inserted in the component 20) varies along its length, in particular increases towards said end 12. This solution, suited to be adopted in each one of the other embodiments, in particular independently of the shape and/or inclined or not inclined orientation of the portion 21, makes it possible to increase the friction between the end portion 12 and the rotatable and translatable element 24, in particular the mutual opposition between the end 12 of the component 10, the element 24 and the portion 21 during the translation of the component 10 towards the outside of the component 20 (obviously, with the release element deactivated and thus, for example, in the position shown in FIG. 15a), thus making the mutual constraint between the two components 10 and 20 safer and more reliable. It should be specified, furthermore, that the cross section of the component 10 (or at least of its end portion 12) may vary depending on the needs and/or circumstances and may be, for example, in the shape of a rectangle or even hexagon etc.

In the further embodiments shown respectively in FIGS. 17a, 17b, 17c and 17d, the seat 25 assumes different shapes. For example, in the embodiment of FIG. 17a the seat 25 is a through seat, meaning that it is such as to place in communication the side of the component 20 facing towards the component 10 with its opposite side. In this case, the inner dimensions of the seat 25 can be both constant (as in the case of FIG. 17a) and variable (as in the case of FIG. 17d), meaning that the inner dimensions of the seat 25 increase towards the side of the component 20 opposite the one facing towards the component 10. Furthermore (as in the cases shown in FIGS. 17b and 17c), the seat 25 can be blind and also in these cases its internal dimensions can be both variable and constant.

FIG. 18 finally shows a special embodiment of the system according to the present invention, in which both the rotatable and translatable element 24 (shown in the figure between the portion 21 and the component 10) and the portion 21 assume special shapes. The element 24 shown in FIG. 18 is in fact substantially cylindrical (defined by a substantially cylindrical main external surface) but it comprises two circumferential grooves 24g (extending along the entire circumference), each defined by a convex surface. The portion 21 in turn comprises two corresponding projections (with cross section in the shape of a pyramid or truncated pyramid) that extend from the upper surface of the portion 21 in contact with the element 24. The projections extend in the direction of the length of the portion 21 (at right angles to the plane of FIG. 18) and thus each of them is engaged in a corresponding groove 24g. Furthermore, the height of the projections 21s may vary along their length (and thus along a direction that is perpendicular to the plane of FIG. 18) and the portion 21 can be inclined or not. The function of the projections 21s is thus to increase the opposing action between the element 24 and the portion 21, in a way that is very similar to the case of the lowered portions of the portion 21 according to the embodiment described above with reference to FIGS. 10a, 10b and 11a, 11b. This embodiment makes it possible to increase the contact surface between the element 24 and the portion 21, thus making the mutual constraint between the component 10 and the component 20 of the system safer and more reliable (with deactivated release element).

Certain preferred embodiments of this invention may be summarized as follows:
1. Quick connecting and/or fastening system suited to mutually connect and disconnect a first and a second element (100, 200), said system comprising a first and a second component (10, 20) suited to be rigidly fixed to said first and second element (100, 200), respectively, said first and said second component (10, 20) being furthermore suited to be mutually connected and disconnected so as to allow said first and second element (100, 200) to be alternatively connected and disconnected to/from each other, said second component (20) being suited to accommodate an end portion (12) of said first component (10) so as to allow the translation of same inside said second component, said second component (20) comprising furthermore counteracting means suited to counteract the translation of said end portion (12) of said first component (10) towards the outside of said second component (20), said system further comprising a rotatable element (24) that is housed inside said second component (20) and suited to be set rotating in a first rotation direction following the translation of the end portion (12) of the first component (10) towards the inside of the second component (20), and suited to be set rotating in a second rotation direction contrary to the first rotation direction following the translation of the end portion (12) of the first component (10) towards the outside of the second component (20), said counteracting means being suited to counteract the rotation of said rotatable element (24) in said second rotation direction, said system being characterized in that said second component (20) comprises release means (27, 28, 40, 44) that during their motion along a first predetermined direction they come into contact with said rotatable element (24) so as to move said rotatable element (24) towards the inside of said second component (20) and therefore so as to cause the decrease of the counteracting force between said rotatable element (24), said end portion (12) and said counteracting means.

2. System according to paragraph 1, characterized in that said second component (20) comprises a rigid portion that together with said end portion (12) of said first component (10) defines an internal space, in that said rotatable element (24) is housed in said space, and in that said end portion (12) of said first component (10), said rigid portion and said rotatable element (24) are mutually arranged and shaped so that said counteracting force is generated due to the mutual action of said rigid portion and said end portion (12) on said rotatable element (24).

3. System according to paragraph 1 or 2, characterized in that said end portion, said rigid portion and said rotatable element (24) are mutually arranged and shaped so that said counteracting force contrary to the translation of said end portion towards the outside of said second component (20) and to the rotation of said rotatable element (24) in said second rotation direction increases during the translation of said end portion towards the outside of said second component (20) while it decreases during the translation of said end portion (12) towards the inside of said second component (20).

4. System according to paragraph 3, characterized in that said end portion, said rigid portion (21) and said rotatable element (24) are mutually arranged and shaped so that said counteracting force contrary to the translation of said end portion (12) towards the outside of said second component (20) and to the rotation of said rotatable element (24) in said second rotation direction increases during the translation of said end portion towards the outside of said second component (20) to the extent that it prevents any further translation of said end portion towards the outside of said second component (20) and any further rotation of said rotatable element (24) in said second rotation direction and therefore until causing the mutual locking of said end portion and said rotatable element (24) in a predetermined mutual position.

5. System according to any of paragraphs 1 to 4, characterized in that said rigid portion (21) of said second component (20) is oriented with respect to said first component (10) and/or shaped so that said rotatable element (24) is pushed towards said end portion (12) of said first component (10) during the rotation of said rotatable element (24) in said first rotation direction.

6. System according to paragraph 5, characterized in that the mutual distance between the contact point of said rotatable element (24) with said rigid portion (21) and said end portion of said second component (20) increases along the direction of translation of said end portion (12) towards the inside of said second component (20) while said mutual distance decreases along the direction of translation of said end portion (12) towards the outside of said second component (20).

7. System according to paragraph 6, characterized in that said rotatable element (24) is in contact with both said end portion (12) and said rigid portion (21) so that the translation of said end portion (12) towards the inside of said second component (20) is transformed into an at least partial translation of said rotatable element (24) towards the inside of said second component (20) while a translation of said end portion (12) towards the outside of said second component (20) is transformed into an at least partial translation of said rotatable element (24) towards the outside of said second component (20).

8. System according to any of the paragraphs 1 to 7, characterized in that first thrusting means are housed inside said second component (20) and exert a thrusting action on said rotatable element (24) towards the internal space defined by said end portion (12) and said rigid portion (21).

9. System according to paragraph 8, characterized in that said first thrusting means comprise elastic means (23).

10. System according to paragraph 8, characterized in that said first thrusting means comprise magnetic and/or electromagnetic means (72a, 72b).

11. System according to any of paragraphs 1 to 10, characterized in that said second component (20) comprises second thrusting means that exert a thrusting action against said release means along a second direction contrary to said first direction of motion of said release means.

12. System according to paragraph 11, characterized in that said second thrusting means comprise elastic means (71).

13. System according to paragraph 11, characterized in that said second thrusting means comprise electromagnetic means (60).

14. System according to any of paragraphs 1 to 13, characterized in that said second component (20) comprises actuator means coupled with said release means which allow said release means to be moved along said first predetermined direction and therefore against the thrusting action exerted by said second thrusting means.

15. System according to paragraph 14, characterized in that said actuator means comprise electromagnetic means (60).

16. System according to paragraph 14, characterized in that said actuator means comprise at least one portion made of a memory form material.

It is important to note that the present invention is not limited to the embodiments described above and illustrated in the figures. On the contrary, all the variants and the changes to the embodiments described and illustrated herein that are clear for the persons skilled in the art fall within the scope of the present invention. The objects and the scope of the present invention are defined in the claims expressed below.

I claim:

1. A system comprising a first component (10) and a second component (20) for detachably connecting with the first component (10),
wherein
the first component comprises a first end (11) and a second end (12) distal from the first end (11);
the second component (20) comprises
(a) a first end,
(b) a second end opposite the first end,
(c) a first seat (25) configured to accommodate the second end (12) of the first component (10) extending between the first end and the second end of the second component (20), wherein the first seat (25) has an opening configured to accept the second end (12) of the first component at the first end of the second component, (d) an inner space (26) in communication with the first seat (25), (e) a rigid portion (21) facing the inner space (26), wherein (1) the rigid portion (21) extends along a vertical plane through the first seat (25) and the opening in the first seat (25) and (2) the rigid portion (21) is inclined relative to the first seat (25), so that the distance between the first seat (25) and the rigid portion (21) decreases from a maximum distance to a minimum distance toward the opening in the first seat (25);

(f) a rotatable element (24) for engaging in translatable rotatable contact with the rigid portion (21) having a size less than the maximum distance between the rigid portion (21) and the first seat (25) and greater than the minimum distance between the rigid portion (21) and the first seat (25); and (g) a first compressible spring (23) located in the inner space (26) having a first end and a second end, wherein the first end of the first compressible spring is engaged with the second component (20) and the second end of the first compressible spring is in contact with the rotatable element (24) for applying pressure against the rotatable element (24), wherein the system further comprises (1) a hollow body (28) encasing the second component (20) having a first end proximal to the first end of the second component (20) and a second end proximal to the second end of the second component (20), wherein (a) the first end of the hollow body (28) has an opening aligned with the opening in the first end of the second component for accommodating the second end (12) of the first component (11) (b) the distance between the first end of the hollow body (28) and the second end of the hollow body (28) is greater than the distance between the first end of the second component (20) and the second end of the second component (20) to allow for displacement of the second component (20) relative to the hollow body (28) alternately toward and away from the first end of the hollow body (28) and (c) the second end of the second component (20) is located between the first end of the hollow body (28) and the second end of the hollow body (28);

(2) a release element (27) located between the rotatable element (24) and the first end of the hollow body (28) within a plane through the opening in the first seat (25), the release element (27) and the rigid portion (21), wherein the release element (27) is configured to contact, and apply pressure against the rotatable element (24) when the hollow body (28) is displaced relative to the second component (20) such that the first end of the hollow body (28) approaches the first end of the second component (20); and (3) a second compressible spring (30) located within the hollow body (28) having a first end engaged with the first end of the hollow body (28) and a second end engaged with the second component, wherein the second compressible spring is configured to apply an elastic force between the hollow body (28) and the second component (20) in favor of displacing the first end of the hollow body (28) and the first end of the second component (20) away from each other.

2. The system according to claim 1, wherein the second component comprises a second seat (29) for the release element (27) between the release element (27) and the rotatable element (24), wherein the second seat (29) comprises a channel capable of guiding the release element (27) toward the rotatable element (24) during displacement of the second component (20) toward the release element (27).

3. The system according to claim 2, wherein the release element (27) has a passageway between the inner space (26) and the opening in the hollow body (28) shaped to accommodate, and allow displacement of, the first component (10) within the release element (27).

4. The system according to claim 1, wherein the release element (27) has a passageway between the inner space (26) and the opening in the hollow body (28) shaped to accommodate, and allow displacement of, the first component (10) within the release element (27).

5. The system according to claim 4, wherein the first component (10) is a bar made of rigid material rigidly fixed to a first element (100) selected from the group consisting of a bearing structure of a shelving system, a bearing structure of a chest of drawers, a door post, a door frame and a window frame.

6. The system according to claim 1, wherein the first component (10) is a bar made of rigid material rigidly fixed to a first element (100) selected from the group consisting of a bearing structure of a shelving system, a bearing structure of a chest of drawers, a door post, a door frame and a window frame.

7. The system according to claim 1, wherein the first component (10) is rigidly fixed to a bearing structure of a chest of drawers and the second component (20) is rigidly fixed to the front panel of a drawer.

8. The system according to claim 1, wherein the first component (10) is rigidly fixed to a door post, a door frame or a window frame and the second component (20) is rigidly fixed to a revolving door or window.

* * * * *